(12) United States Patent
Brucker et al.

(10) Patent No.: US 12,326,210 B2
(45) Date of Patent: Jun. 10, 2025

(54) QUICK ATTACH CLAMP

(71) Applicant: HellermannTyton Corporation, Milwaukee, WI (US)

(72) Inventors: Brent Brucker, Albuquerque, NM (US); Michael Toll, Whitefish Bay, WI (US)

(73) Assignee: HellermannTyton Corporation, Milwaukee, WI (US)

( * ) Notice: Subject to any disclaimer, the term of this patent is extended or adjusted under 35 U.S.C. 154(b) by 177 days.

(21) Appl. No.: 18/125,321

(22) Filed: Mar. 23, 2023

(65) Prior Publication Data

US 2023/0304608 A1 Sep. 28, 2023

Related U.S. Application Data

(60) Provisional application No. 63/269,875, filed on Mar. 24, 2022.

(51) Int. Cl.
*F16L 3/00* (2006.01)
*F16L 3/10* (2006.01)
(Continued)

(52) U.S. Cl.
CPC ............... *F16L 3/11* (2013.01); *F16L 3/1075* (2013.01); *H02G 3/32* (2013.01); *H02S 20/32* (2014.12)

(58) Field of Classification Search
None
See application file for complete search history.

(56) References Cited

U.S. PATENT DOCUMENTS

| 639,169 A | 12/1899 | Goff et al. |
| 1,308,869 A | 7/1919 | Rohmer |

(Continued)

FOREIGN PATENT DOCUMENTS

| CN | 1144313 | 3/1997 |
| CN | 101180488 | 5/2008 |

(Continued)

OTHER PUBLICATIONS

"Advisory Action", U.S. Appl. No. 15/094,713, filed Feb. 22, 2018, 3 pages.

(Continued)

*Primary Examiner* — Steven M Marsh
(74) *Attorney, Agent, or Firm* — Colby Nipper PLLC

(57) ABSTRACT

This document describes clamp assemblies, techniques for manufacturing clamp assemblies, and techniques for using clamp assemblies. In aspects, a disclosed clamp assembly is configured for securing an elongate member to a support structure and includes a clamp, a bracket, and an interlock mechanism. The clamp includes a first clamp member and a second clamp member, the clamp defining a passageway configured to enclose at least a portion of the elongate member. The clamp also includes a mounting member that includes a mounting insert channel configured to receive a clamp mounting attachment. The bracket includes a base that includes the clamp mounting attachment. The base further includes a support structure connector that is configured for releasably attaching the bracket to the support structure. The interlock mechanism is configured for releasably connecting the mounting member of the clamp and the base of the bracket together.

20 Claims, 11 Drawing Sheets

(51) Int. Cl.
  *F16L 3/11* (2006.01)
  *H02G 3/32* (2006.01)
  *H02S 20/32* (2014.01)

(56) References Cited

U.S. PATENT DOCUMENTS

| | | |
|---|---|---|
| 1,313,372 A | 8/1919 | Doge |
| 1,365,626 A | 1/1921 | Pleister et al. |
| 1,437,144 A | 11/1922 | Isaacson |
| 2,193,291 A | 3/1940 | Marchins |
| 2,884,214 A | 4/1959 | Wrobel |
| 2,945,713 A | 7/1960 | Sears |
| 2,969,216 A | 1/1961 | Hallsey |
| 3,149,808 A | 9/1964 | Weckesser |
| 3,250,505 A | 5/1966 | Rodman et al. |
| 3,252,677 A | 5/1966 | Raymond |
| 3,463,427 A | 8/1969 | Fisher |
| 3,483,787 A | 12/1969 | Saunders |
| 3,486,725 A | 12/1969 | Hidassy |
| 3,504,937 A | 4/1970 | Panovic |
| 3,581,349 A | 6/1971 | Verspieren |
| 3,605,199 A | 9/1971 | Eberhardt |
| 3,632,069 A | 1/1972 | Thayer et al. |
| 3,632,070 A | 1/1972 | Thayer et al. |
| 3,632,071 A | 1/1972 | Cameron et al. |
| 3,705,708 A | 12/1972 | Cunningham |
| 3,737,128 A | 6/1973 | Schuplin |
| 3,810,279 A | 5/1974 | Swick et al. |
| 3,913,876 A | 10/1975 | McSherry |
| 3,921,496 A | 11/1975 | Helderman |
| 4,037,978 A | 7/1977 | Connelly |
| 4,128,220 A | 12/1978 | McNeel |
| 4,141,116 A | 2/1979 | Zalonis |
| 4,264,047 A | 4/1981 | Nelson et al. |
| 4,318,518 A | 3/1982 | Davis |
| 4,386,752 A | 6/1983 | Pavlak et al. |
| 4,396,329 A | 8/1983 | Wollar |
| 4,402,641 A | 9/1983 | Artf |
| 4,427,328 A | 1/1984 | Kojima |
| 4,445,255 A * | 5/1984 | Olejak .................... E21B 17/01 248/74.1 |
| 4,472,918 A | 9/1984 | Mach |
| 4,490,886 A | 1/1985 | Omata |
| 4,509,710 A | 4/1985 | Cooper et al. |
| 4,517,710 A | 5/1985 | Beckmann |
| 4,552,481 A | 11/1985 | Bluett |
| 4,609,171 A | 9/1986 | Matsui |
| 4,652,192 A | 3/1987 | Schaller |
| 4,665,588 A | 5/1987 | Nakano |
| 4,688,961 A | 8/1987 | Shioda et al. |
| 4,705,245 A | 11/1987 | Osada |
| 4,705,442 A | 11/1987 | Fucci |
| 4,728,238 A | 3/1988 | Chisholm et al. |
| 4,766,651 A | 8/1988 | Kobayashi |
| 4,768,741 A | 9/1988 | Logson |
| 4,779,828 A | 10/1988 | Munch |
| 4,817,901 A | 4/1989 | Kuo et al. |
| 4,865,281 A | 9/1989 | Wollar |
| 4,875,647 A | 10/1989 | Takagi et al. |
| 4,878,791 A | 11/1989 | Kurihara et al. |
| 4,900,210 A | 2/1990 | Buchanan |
| 4,902,182 A | 2/1990 | Lewis |
| 4,910,831 A | 3/1990 | Bingold |
| 4,919,373 A | 4/1990 | Caveney et al. |
| 4,920,618 A | 5/1990 | Iguchi |
| 4,925,136 A | 5/1990 | Knott |
| 4,936,530 A | 6/1990 | Wollar |
| 4,938,645 A | 7/1990 | Wollar |
| 4,944,475 A | 7/1990 | Ono et al. |
| 4,955,749 A | 9/1990 | Panovic |
| 4,976,578 A | 12/1990 | Mathes et al. |
| 4,993,669 A | 2/1991 | Dyer |
| 4,993,903 A | 2/1991 | Kraus |
| 5,039,267 A | 8/1991 | Wollar |
| 5,040,752 A | 8/1991 | Morrison |
| D323,106 S | 1/1992 | Daigle et al. |
| 5,088,158 A | 2/1992 | Burkholder et al. |
| 5,102,075 A | 4/1992 | Dyer |
| 5,131,613 A | 7/1992 | Kamiya et al. |
| 5,221,065 A | 6/1993 | Siems et al. |
| 5,224,244 A | 7/1993 | Ikeda et al. |
| 5,288,189 A | 2/1994 | Hepworth |
| 5,305,978 A | 4/1994 | Current |
| 5,306,098 A | 4/1994 | Lewis |
| D347,156 S | 5/1994 | Starrett et al. |
| 5,324,151 A | 6/1994 | Szudarek et al. |
| 5,328,290 A | 7/1994 | Plastina |
| 5,332,179 A | 7/1994 | Kuffel et al. |
| 5,333,822 A | 8/1994 | Benoit et al. |
| 5,337,983 A | 8/1994 | Mailey |
| 5,344,112 A | 9/1994 | Peterson et al. |
| 5,354,021 A | 10/1994 | Farrell |
| 5,367,750 A | 11/1994 | Ward et al. |
| 5,368,261 A | 11/1994 | Caveney et al. |
| 5,385,321 A | 1/1995 | Kume et al. |
| 5,386,615 A | 2/1995 | Bernard |
| 5,390,876 A | 2/1995 | Hatano et al. |
| 5,393,185 A | 2/1995 | Duffy, Jr. |
| 5,398,383 A | 3/1995 | Bingold |
| 5,468,108 A | 11/1995 | Sullivan et al. |
| 5,494,245 A | 2/1996 | Suzuki et al. |
| 5,538,208 A | 7/1996 | Cordes et al. |
| D372,665 S | 8/1996 | Kim |
| 5,601,261 A | 2/1997 | Koike |
| 5,636,937 A | 6/1997 | Zemlicka |
| 5,653,409 A | 8/1997 | White et al. |
| 5,664,754 A | 9/1997 | Gaenslen |
| 5,669,731 A | 9/1997 | Hironaka et al. |
| 5,704,573 A | 1/1998 | de Beers et al. |
| 5,718,025 A | 2/1998 | Courtin |
| 5,730,399 A | 3/1998 | Baginski |
| 5,732,446 A | 3/1998 | Blanks |
| 5,765,787 A | 6/1998 | de Beers et al. |
| 5,774,944 A | 7/1998 | Choi |
| 5,806,812 A | 9/1998 | Jacobs et al. |
| 5,813,810 A | 9/1998 | Izume |
| 5,820,048 A | 10/1998 | Shereyk et al. |
| 5,820,083 A | 10/1998 | Geiger |
| 5,862,927 A | 1/1999 | Tebeau |
| 5,884,367 A | 3/1999 | Teagno et al. |
| 5,890,265 A | 4/1999 | Christian et al. |
| 5,907,891 A | 6/1999 | Meyer |
| 5,921,510 A | 7/1999 | Benoit et al. |
| 5,926,921 A | 7/1999 | Benoit |
| 5,937,488 A | 8/1999 | Geiwer |
| 5,941,483 A | 8/1999 | Baginski |
| 5,966,781 A | 10/1999 | Geiger |
| D417,142 S | 11/1999 | Kim |
| D417,387 S | 12/1999 | Kim |
| D417,838 S | 12/1999 | Kim |
| 6,003,208 A | 12/1999 | Christian et al. |
| D424,922 S | 5/2000 | Sherman et al. |
| 6,105,908 A | 8/2000 | Kraus |
| 6,151,761 A | 11/2000 | Thompson |
| 6,196,033 B1 | 3/2001 | Dowdle |
| 6,196,751 B1 | 3/2001 | Khokhar |
| 6,203,240 B1 | 3/2001 | Hironaka et al. |
| 6,240,602 B1 | 6/2001 | Geiger |
| 6,253,421 B1 | 7/2001 | Kraus |
| 6,320,134 B1 | 11/2001 | Rehberg et al. |
| 6,364,257 B1 | 4/2002 | Holder |
| 6,398,169 B1 | 6/2002 | Streit |
| 6,443,403 B1 | 9/2002 | Page et al. |
| 6,532,631 B2 | 3/2003 | Rohaly et al. |
| 6,533,226 B2 | 3/2003 | Geiger |
| 6,536,718 B2 | 3/2003 | Benito-Navazo |
| 6,550,723 B2 | 4/2003 | Fraley et al. |
| 6,560,822 B2 | 5/2003 | Caveney et al. |
| 6,592,083 B1 | 7/2003 | Hobson et al. |
| 6,634,063 B2 | 10/2003 | Joseph |
| 6,655,644 B1 | 12/2003 | Gretz |
| 6,669,150 B2 | 12/2003 | Benoit |
| 6,669,426 B1 | 12/2003 | Detter et al. |
| 6,718,597 B2 | 4/2004 | Geiger |

(56) References Cited

U.S. PATENT DOCUMENTS

| | | |
|---|---|---|
| 6,719,513 B1 | 4/2004 | Moutousis et al. |
| 6,732,982 B1 | 5/2004 | Messinger |
| 6,745,439 B2 | 6/2004 | Browniee et al. |
| 6,749,157 B2 | 6/2004 | Takeuchi |
| 6,807,714 B2 | 10/2004 | O'Young et al. |
| 6,809,257 B2 | 10/2004 | Shibuya |
| 7,055,783 B2 | 6/2006 | Rosemann et al. |
| 7,114,686 B2 | 10/2006 | Andrigo |
| 7,114,687 B2 | 10/2006 | Swantner et al. |
| 7,131,168 B2 | 11/2006 | Pangallo |
| 7,186,068 B2 | 3/2007 | Zoubek et al. |
| 7,222,925 B2 | 5/2007 | Yu et al. |
| 7,375,282 B2 | 5/2008 | James |
| D570,673 S | 6/2008 | Geiger et al. |
| 7,437,804 B1 | 10/2008 | Geiger et al. |
| 7,448,579 B2 | 11/2008 | Kwilosz |
| 7,503,528 B2 | 3/2009 | Adams et al. |
| 7,510,361 B2 | 3/2009 | Mostazo-oviedo |
| 7,594,629 B2 | 9/2009 | Smutny et al. |
| 7,614,836 B2 | 11/2009 | Mohiuddin et al. |
| 7,640,707 B2 | 1/2010 | Johnson et al. |
| 7,661,631 B2 | 2/2010 | Ibaraki |
| 7,661,633 B2 | 2/2010 | Igarashi et al. |
| 7,753,320 B2 | 7/2010 | Geiger et al. |
| 7,753,321 B2 | 7/2010 | Geiger |
| 7,757,997 B2 | 7/2010 | Smutny et al. |
| 7,793,895 B2 | 9/2010 | Franks |
| 7,862,272 B2 | 1/2011 | Nakajima |
| D631,739 S | 2/2011 | Craig et al. |
| 7,887,012 B2 | 2/2011 | Desai et al. |
| 7,891,926 B2 | 2/2011 | Jakson |
| 7,896,601 B2 | 3/2011 | Kalyanadurga et al. |
| 8,020,812 B2 | 9/2011 | Matsuno et al. |
| 8,025,258 B2 | 9/2011 | Eldridge |
| 8,028,962 B2 | 10/2011 | Geiger |
| 8,177,173 B2 | 5/2012 | Spiess |
| 8,221,042 B2 | 7/2012 | Vitali |
| 8,240,343 B2 | 8/2012 | Dyer et al. |
| 8,282,047 B2 | 10/2012 | Franks |
| 8,286,924 B2 | 10/2012 | Sano et al. |
| 8,328,457 B2 | 12/2012 | Werth |
| 8,333,514 B2 | 12/2012 | Weimer |
| 8,533,919 B2 | 9/2013 | Schliessner |
| 8,708,289 B2 | 4/2014 | Allenbach et al. |
| 8,833,706 B2 | 9/2014 | Elsmore et al. |
| 8,870,135 B2 | 10/2014 | Grubbs |
| 8,967,556 B2 | 3/2015 | Meyers et al. |
| 8,979,039 B2 | 3/2015 | Shiga |
| 8,991,774 B2 | 3/2015 | Hajduch |
| 9,188,247 B2 | 11/2015 | Pauchet et al. |
| 9,653,901 B2 | 5/2017 | Miyamoto et al. |
| 9,718,591 B2 | 8/2017 | Lu et al. |
| D804,942 S | 12/2017 | Toll et al. |
| D824,622 S | 7/2018 | Toll et al. |
| 10,036,487 B2 | 7/2018 | Duggan |
| D829,090 S | 9/2018 | Toll et al. |
| 10,119,631 B2 | 11/2018 | Toll et al. |
| 10,316,991 B2 | 6/2019 | Gallion |
| 10,323,774 B2 | 6/2019 | Van Hulst et al. |
| 10,399,516 B2 | 9/2019 | Chapman |
| 10,634,180 B2 | 4/2020 | Sawada |
| 10,903,632 B2 | 1/2021 | Toll et al. |
| D909,843 S | 2/2021 | Van Hulst et al. |
| D909,844 S | 2/2021 | Van Hulst et al. |
| 10,982,795 B2 | 4/2021 | Tally et al. |
| 11,209,030 B2 | 12/2021 | Vaughn et al. |
| D948,304 S | 4/2022 | Hulst et al. |
| D948,981 S | 4/2022 | Van Hulst et al. |
| D950,370 S | 5/2022 | Devore et al. |
| 11,355,905 B2 | 6/2022 | Toll et al. |
| 11,705,703 B2 | 7/2023 | Toll et al. |
| 2002/0104196 A1 | 8/2002 | Geiger |
| 2002/0109050 A1 | 8/2002 | Winton, III |
| 2002/0179780 A1 | 12/2002 | Benoit et al. |
| 2003/0189140 A1 | 10/2003 | Takeuchi |
| 2003/0231943 A1 | 12/2003 | Detter et al. |
| 2004/0076465 A1 | 4/2004 | Geiger |
| 2005/0116122 A1 | 6/2005 | Nakanishi |
| 2005/0242247 A1 | 11/2005 | Geiger |
| 2005/0253025 A1 | 11/2005 | Benoit et al. |
| 2006/0130286 A1 | 6/2006 | Igarashi et al. |
| 2006/0239796 A1 | 10/2006 | Franks |
| 2007/0023586 A1 | 2/2007 | Geiger |
| 2007/0034769 A1 | 2/2007 | Kwilosz |
| 2007/0065256 A1 | 3/2007 | Wakabayashi |
| 2007/0102594 A1 | 5/2007 | Geiger et al. |
| 2007/0134073 A1 | 6/2007 | Shereyk et al. |
| 2007/0272807 A1 | 11/2007 | Takagaki |
| 2007/0284486 A1 | 12/2007 | Smutny et al. |
| 2008/0267686 A1 | 10/2008 | Blanks |
| 2008/0296444 A1 | 12/2008 | Geiger |
| 2009/0307883 A1 | 12/2009 | Schliessner |
| 2010/0207001 A1 | 8/2010 | Smith et al. |
| 2010/0223765 A1 | 9/2010 | Vitali |
| 2010/0243824 A1 | 9/2010 | Desai et al. |
| 2011/0239412 A1 | 10/2011 | Sano et al. |
| 2012/0217354 A1 | 8/2012 | Walraven et al. |
| 2012/0217355 A1 | 8/2012 | Geiger et al. |
| 2012/0227221 A1 | 9/2012 | Whitaker et al. |
| 2013/0001373 A1 | 1/2013 | Ogawa |
| 2013/0119208 A1 | 5/2013 | Geiger |
| 2013/0160246 A1 | 6/2013 | Hajduch |
| 2014/0151514 A1 | 6/2014 | Asai |
| 2016/0001944 A1 | 1/2016 | Aoyama |
| 2016/0114743 A1 | 4/2016 | Miyamoto et al. |
| 2016/0223100 A1 | 8/2016 | Geiger |
| 2017/0146154 A1* | 5/2017 | Tally .................... F16L 3/1075 |
| 2017/0227141 A1* | 8/2017 | Toll ...................... F16L 3/1075 |
| 2017/0297516 A1 | 10/2017 | Loebe |
| 2018/0045337 A1 | 2/2018 | Gallion |
| 2018/0087692 A1 | 3/2018 | Geiger et al. |
| 2018/0274699 A1* | 9/2018 | Ratzlaff .................. H02G 3/32 |
| 2019/0036314 A1* | 1/2019 | Toll ...................... H02G 3/0456 |
| 2019/0331258 A1 | 10/2019 | Geiger et al. |
| 2021/0119430 A1 | 4/2021 | Toll et al. |
| 2022/0239080 A1 | 7/2022 | Toll et al. |
| 2023/0092063 A1 | 3/2023 | Villbrandt |
| 2023/0256274 A1 | 8/2023 | Cherdo et al. |
| 2024/0003374 A1 | 1/2024 | Adams |
| 2024/0209961 A1* | 6/2024 | Hopkins ............... F16L 3/1075 |
| 2025/0122956 A1 | 4/2025 | Spangler et al. |

FOREIGN PATENT DOCUMENTS

| | | |
|---|---|---|
| CN | 102472415 | 5/2012 |
| CN | 103998843 | 8/2014 |
| CN | 108457938 | 8/2018 |
| DE | 1275650 | 8/1968 |
| DE | 19856945 | 6/2000 |
| DE | 102006025706 | 12/2007 |
| DE | 102009034546 | 7/2011 |
| EP | 943240 | 10/1961 |
| EP | 0069223 | 1/1983 |
| EP | 1887232 | 2/2008 |
| EP | 2056419 | 5/2009 |
| EP | 2058242 | 5/2009 |
| EP | 3228880 | 10/2017 |
| EP | 2141397 | 1/2020 |
| FR | 2322286 | 3/1977 |
| FR | 2437086 | 4/1980 |
| GB | 933929 | 8/1963 |
| GB | 1451009 | 9/1976 |
| GB | 2129863 | 5/1984 |
| JP | H0543721 | 6/1993 |
| JP | 2002199555 | 7/2002 |
| JP | 2013143842 | 7/2013 |
| JP | 2014108032 | 6/2014 |
| JP | 2014138517 | 7/2014 |
| JP | 2018071733 A | 5/2018 |
| RU | 2535452 | 12/2014 |
| WO | 0025031 A1 | 5/2000 |
| WO | 2006113867 | 10/2006 |

(56) References Cited

FOREIGN PATENT DOCUMENTS

| | | |
|---|---|---|
| WO | 2019032276 A1 | 2/2019 |
| WO | 2022192680 A1 | 9/2022 |

OTHER PUBLICATIONS

"Advisory Action", U.S. Appl. No. 15/094,713, filed Mar. 6, 2020, 3 pages.
"Advisory Action", U.S. Appl. No. 10/835,864, filed May 5, 2006, 3 pages.
"Advisory Action", U.S. Appl. No. 10/835,864, filed Aug. 30, 2007, 3 pages.
"European Search Report", EP Application No. 18200778.1, Feb. 6, 2019.
"Extended European Search Report", EP Application No. 19199457.3, Jul. 27, 2020, 11 pages.
"Extended European Search Report", EP Application No. 17154684.9, Jun. 22, 2017, 8 pages.
"Extended European Search Report", EP Application No. 17164002.2, Sep. 5, 2017, 8 pages.
"Final Office Action", U.S. Appl. No. 15/094,713, filed Jan. 30, 2017, 11 pages.
"Final Office Action", U.S. Appl. No. 10/835,864, filed May 31, 2007, 11 pages.
"Final Office Action", U.S. Appl. No. 17/658,730, filed Dec. 27, 2022, 11 pages.
"Final Office Action", U.S. Appl. No. 13/220,308, filed Dec. 11, 2013, 12 pages.
"Final Office Action", U.S. Appl. No. 15/094,713, filed Nov. 30, 2017, 13 pages.
"Final Office Action", U.S. Appl. No. 15/094,713, filed Feb. 6, 2020, 26 pages.
"Final Office Action", U.S. Appl. No. 10/835,864, filed Mar. 24, 2006, 8 pages.
"Final Office Action", U.S. Appl. No. 11/191,654, filed Oct. 9, 2007, 9 pages.
"Final Office Action", U.S. Appl. No. 11/580,363, filed Oct. 16, 2009, 9 pages.
"Foreign Office Action", CN Application No. 201910924869.8, Sep. 9, 2021, 10 pages.
"Foreign Office Action", CN Application No. 201710229338.8, Oct. 8, 2018, 12 page.
"Foreign Office Action", CN Application No. 201710066210.4, Jan. 21, 2020, 13 pages.
"Foreign Office Action", CN Application No. 201910924869.8, Jun. 15, 2021, 13 pages.
"Foreign Office Action", CN Application No. 201710229388.8, Dec. 20, 2019, 15 pages.
"Foreign Office Action", CN Application No. 201710229388.8, Jun. 24, 2019, 16 pages.
"Foreign Office Action", KR Application No. 10-2019-0117178, Sep. 1, 2020, 16 pages.
"Foreign Office Action", CN Application No. 202011230192.7, Oct. 13, 2022, 17 pages.
"Foreign Office Action", CN Application No. 201910924869.8, Dec. 25, 2020, 21 pages.
"Foreign Office Action", JP Application No. 2019-164417, Apr. 15, 2021, 4 pages.
"Foreign Office Action", EP Application No. 17164002.2, Aug. 16, 2018, 4 pages.
"Foreign Office Action", EP Application No. 19199457.3, Dec. 3, 2020, 4 pages.
"Foreign Office Action", CN Application No. 201710229388.8, Jul. 1, 2020, 8 pages.
"Foreign Office Action", JP Application No. 2019-164417, Oct. 6, 2020, 8 pages.
"Foreign Office Action", CN Application No. 202011230192.7, Jun. 14, 2022, 9 pages.
"Non-Final Office Action", U.S. Appl. No. 15/423,419, filed Jan. 11, 2018, 10 pages.
"Non-Final Office Action", U.S. Appl. No. 17/136,945, filed Sep. 15, 2021, 10 pages.
"Non-Final Office Action", U.S. Appl. No. 13/220,308, filed Feb. 14, 2014, 12 pages.
"Non-Final Office Action", U.S. Appl. No. 15/094,713, filed May 30, 2017, 12 pages.
"Non-Final Office Action", U.S. Appl. No. 13/738,567, filed Mar. 27, 2015, 13 pages.
"Non-Final Office Action", U.S. Appl. No. 17/658,730, filed Sep. 13, 2022, 13 pages.
"Non-Final Office Action", U.S. Appl. No. 15/094,713, filed Jun. 22, 2016, 17 pages.
"Non-Final Office Action", U.S. Appl. No. 16/510,065, filed Aug. 29, 2019, 20 pages.
"Non-Final Office Action", U.S. Appl. No. 15/094,713, filed Feb. 14, 2019, 26 pages.
"Non-Final Office Action", U.S. Appl. No. 16/147,668, filed May 13, 2020, 5 pages.
"Non-Final Office Action", U.S. Appl. No. 10/835,864, filed Aug. 25, 2006, 6 pages.
"Non-Final Office Action", U.S. Appl. No. 12/221,632, filed Nov. 27, 2009, 6 pages.
"Non-Final Office Action", U.S. Appl. No. 13/220,308, filed Jun. 20, 2013, 7 pages.
"Non-Final Office Action", U.S. Appl. No. 13/738,567, filed Oct. 8, 2015, 7 pages.
"Non-Final Office Action", U.S. Appl. No. 10/835,864, filed Oct. 6, 2005, 8 pages.
"Non-Final Office Action", U.S. Appl. No. 11/580,363, filed Dec. 22, 2008, 8 pages.
"Non-Final Office Action", U.S. Appl. No. 11/191,654, filed Jun. 9, 2006, 9 pages.
"Notice of Allowance", U.S. Appl. No. 16/147,668, filed Jul. 2, 2018, 10 pages.
"Notice of Allowance", U.S. Appl. No. 17/136,945, filed Mar. 3, 2022, 5 pages.
"Notice of Allowance", U.S. Appl. No. 10/835,864, filed May 27, 2011, 5 pages.
"Notice of Allowance", U.S. Appl. No. 16/147,668, filed Sep. 17, 2020, 5 Pages.
"Notice of Allowance", U.S. Appl. No. 12/221,632, filed Mar. 30, 2010, 6 pages.
"Notice of Allowance", U.S. Appl. No. 17/658,730, filed Mar. 2, 2023, 7 pages.
"Notice of Allowance", U.S. Appl. No. 11/580,363 IDS, filed Mar. 29, 2010, 7 pages.
"Notice of Allowance", U.S. Appl. No. 11/191,654, filed Jul. 10, 2008, 7 pages.
"Partial European Search Report", EP Application No. 19199457.3, Feb. 5, 2020, 12 pages.
"Restriction Requirement", U.S. Appl. No. 12/221,632, filed Jul. 7, 2009, 5 pages.
"Restriction Requirement", U.S. Appl. No. 16/147,668, filed Feb. 18, 2020, 6 pages.
"Restriction Requirement", U.S. Appl. No. 11/580,363, filed Oct. 2, 2008, 6 pages.
"Restriction Requirement", U.S. Appl. No. 15/423,419, filed Dec. 13, 2017, 7 pages.
"Solar Energy—Reliable Cable Management Solutions for Solar Plants", Retrieved at: https://www.hellermanntyton.com/shared/datasheets/1820602.pdf—on Mar. 15, 2023, 37 pages.
Cab Solar, , "Torque Tube Hangers Quick and Easy Under Panel Cable Management", https://www.cabproducts.com/wp-content/uploads/2022/08/CAB-Solar-Tube-Hangers-SalesSheet5-AUG2022A.pdf, Aug. 2022, 2 pages.
"Extended European Search Report", EP Application No. 2318950.9, Nov. 23, 2023, 8 pages.
"HellermannTyton Solar Brochure", Feb. 2021, 37 pages.
"Specification Sheet—Part No. 151-01567", Retrieved at: https://cl-pdfv10.ae-admin.com/hellermanntyton/files/151-01567.pdf—on May 30, 2024, 4 pages.

(56) References Cited

OTHER PUBLICATIONS

"Specification Sheet—Part No. 156-02230", Retrieved at: https://cl-pdfv10.ae-admin.com/hellermanntyton/files/156-02230.pdf—on May 30, 2024, 4 pages.

"T50R Standard Cable Tie With EC4 Mount", Retrieved at: https://assets.hellermanntyton.us/m/dca0af47ad9b8a65/original/10-0831-006-CSU-pdf.pdf, Mar. 20, 2017, 1 page.

"Wedge Clip", Drawing No. 13-0119-200-CSU, Oct. 10, 2016, 1 page.

"ZipShield—Pile Mount Wire Protector", Copyright 2021, Jan. 2021, 1 page.

"Non-Final Office Action", U.S. Appl. No. 18/321,570, filed Dec. 17, 2024, 7 pages.

"Extended European Search Report", EP Application No. 24205213.2, Mar. 6, 2025, 9 pages.

"Foreign Office Action", KR Application No. 10-2023-0082314, Mar. 31, 2025, 22 pages.

"Notice of Allowance", U.S. Appl. No. 18/321,570, filed Apr. 30, 2025, 5 pages.

\* cited by examiner

QUICK ATTACH CLAMP

CROSS-REFERENCE TO RELATED APPLICATION

This application claims the benefit of U.S. Application No. 63/269,875, filed Mar. 24, 2022, the disclosure of which is incorporated by reference.

BACKGROUND

A photovoltaic system may include one or more panels (e.g., solar panels) of photovoltaic cells mounted on a support structure. In some applications, the solar panels are fixed in place on the support structure, while in other applications, the support structure may include a solar tracker that is configured to orient the solar panels towards the Sun. An example solar tracker support structure includes one or more column supports and a torque tube that is rotationally mounted on the column support. One or more solar panels are mounted on the torque tube. Rotation of the torque tube enables the solar tracker to orient the solar panels.

In a typical photovoltaic system installation, the electrical output of the solar panels is transferred to the electrical grid or an electrical storage device (e.g., battery) through one or more electrical cables (photovoltaic cables). The electrical cables are routed, secured, and/or connected to the support structure at one or more of the column supports, torque tubes, mounting brackets, and the like.

In one example of such an application, a band clamp (panel mount) is used to mount a solar panel to a round torque tube. A typical band clamp includes a flexible metal strap that extends from a first end collar to a second end collar. A tangentially arranged rod (bolt, threaded rod) and nut connector extends between the first and second end collars, enabling the strap to be adjustably tightened around the torque tube. In one example, the rod is a T-bolt having a head in the first end collar and the nut is defined in the second end collar. An outer shank portion of the rod extends out of the nut. In this example, the exposed outer shank portion (tip) of the rod and the first end collar can provide a bracket anchoring point for the routing of photovoltaic cables (e.g., by a metal bracket extending between the first end collar and the tip). Alternatively, to provide a bracket anchoring point for routing, the band clamp can be disassembled/re-assembled by unscrewing the rod from the nut, inserting a photovoltaic cable mounting bracket onto the bolt, positioning the bracket at an inner shank portion of the rod, and then screwing the rod back onto the nut.

In a second example, the torque tube is polygonal in cross-section and a polygonal mounting bracket shaped to engage the sides of the torque tube (e.g., to snap or slide onto the torque tube) is used to attach the solar panel to the torque tube. In the polygonal torque tube example, a support surface of the mounting bracket can provide a structure and anchoring point for routing photovoltaic cables.

SUMMARY

This document describes clamp assemblies. Also described are techniques for manufacturing clamp assemblies and techniques for using clamp assemblies.

In some aspects, the techniques described herein relate to a clamp assembly configured for securing an elongate member to a support structure, the clamp assembly including: a clamp, the clamp including: a first clamp member; a second clamp member, at least one of the first clamp member or the second clamp member defining a passageway configured to enclose at least a portion of the elongate member; and a mounting member defined in at least one of the first clamp member or the second clamp member, the mounting member including a mounting insert channel configured to receive a clamp mounting attachment; and a bracket, the bracket including: a base, the base including the clamp mounting attachment configured for receipt into the mounting insert channel of the mounting member to connect the bracket to the clamp; and a support structure connector configured for attaching the bracket to the support structure; and an interlock mechanism configured for connecting the mounting member of the clamp and the base of the bracket together.

In some aspects, the techniques described herein relate to a clamp assembly configured for securing an elongate member to a support structure, the clamp assembly including: a clamp, the clamp including: a first clamp member including a first clamp member first end, a second clamp member including a second clamp member first end; a hinge mechanism joining the first ends of the first and second clamp members; at least one of the first clamp member or the second clamp member defining a passageway configured to enclose at least a portion of the elongate member; the first clamp member including a first locking mechanism, the second clamp member including a second locking mechanism, the first and second locking mechanisms configured for locking a position of respective second ends of the first and second clamp members together around the elongate member with the elongate member received in the passageway; a mounting member defined in at least one of the first clamp member or the second clamp member, the mounting member defining a mounting insert channel configured to receive a clamp mounting attachment; and a bracket, the bracket configured to connect with the mounting member, the bracket including: a base, the base including the clamp mounting attachment configured for receipt into the mounting insert channel of the mounting member to connect the bracket to the clamp; and a support structure connector configured for attaching the bracket to the support structure; and an interlock mechanism configured for connecting the mounting member of the clamp and the base of the bracket together.

This Summary is provided to introduce simplified concepts of clamp assemblies, techniques for manufacturing clamp assemblies, and techniques for using clamp assemblies, which are further described below in the Detailed Description and are illustrated in the Drawings. This Summary is not intended to identify essential features of the claimed subject matter, nor is it intended for use in determining the scope of the claimed subject matter.

BRIEF DESCRIPTION OF THE DRAWINGS

The details of one or more aspects of clamp assemblies, techniques for manufacturing clamp assemblies, and techniques for using clamp assemblies are described with reference to the following Drawings, in which the use of the same numbers in different instances may indicate like features and/or components.

DETAILED DESCRIPTION

Overview

Figure 1:
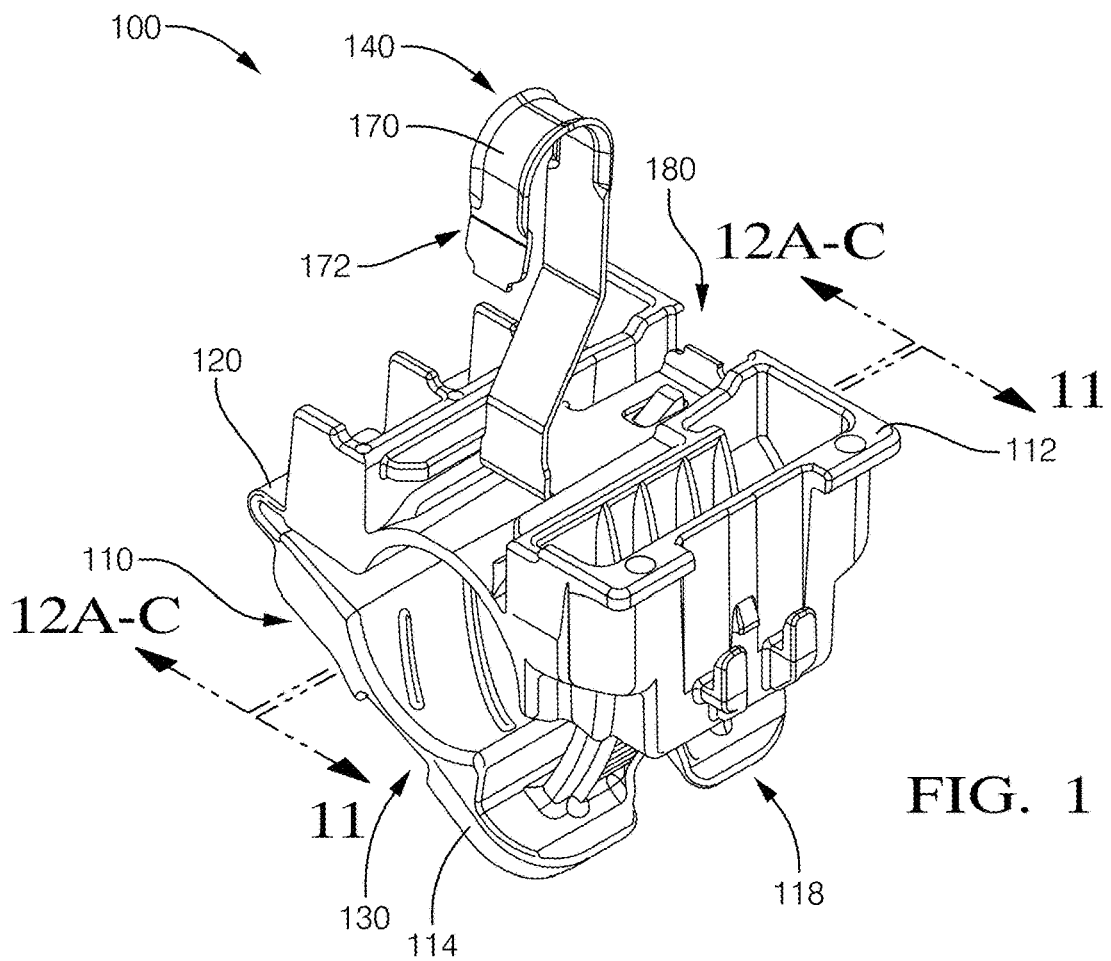
FIG. 1 is a top, front perspective view of a first clamp assembly, which illustrates a clamp in a closed position.

This document describes clamp assemblies, techniques for manufacturing clamp assemblies, and techniques for using clamp assemblies. Aspects described in the present disclosure address technical problems associated with the routing, securement, and/or connection of electrical cables to a support structure of a photovoltaic system (e.g., at one or more of column supports, torque tubes, mounting brackets, and the like).

The disclosed clamp assemblies include a clamp, a bracket, and an interlock mechanism, which are together configured for securing an elongate member to a support structure. The clamp includes a first clamp member and a second clamp member. At least one of the first clamp member or the second clamp member defines a passageway configured to enclose at least a portion of the elongate member. In aspects, the clamp is an adjustable P-clamp. The clamp further includes a mounting member defined in at least one of the first clamp member or the second clamp member. The mounting member includes a mounting insert channel configured to receive a clamp mounting attachment of the bracket. The bracket includes a base. The base includes the clamp mounting attachment. The clamp mounting attachment is configured for receipt into the mounting insert channel of the mounting member to connect the bracket to the clamp. The bracket further includes a support structure connector that is configured for attaching the bracket to the support structure. In aspects, the attachment may be releasable. The interlock mechanism is configured for connecting the mounting member of the clamp and the base of the bracket together. In aspects, the connection may be releasable.

In aspects, a clamp assembly includes a mating interface between the clamp and the mounting bracket, which permits sliding and latching the bracket into the clamp to lock it in place (e.g., it automatically latches when the sliding forces exceed nine kilograms (9 kg)). Such a configuration increases the speed of setting up clamp assemblies for use in the field. Through use of the disclosed clamp assemblies, electrical cables can be routed through the clamps before installation of the clamp assemblies on the support structure. In some aspects, this routing provides for orientation of the cables in a proper direction (e.g., a receiver is generally parallel to a bolt hooked onto). A disclosed clamp assembly may be configured modularly, with several different sizes of clamps available for interchangeable connection with a bracket, enabling the securement of a variety of elongate member bundle diameter sizes.

Additionally, the disclosed clamp assemblies result in a simpler installation and routing of elongate members (e.g., electrical cables) to a supporting structure. For example, in use, an installer can attach a hook portion of a clamp assembly onto a threaded bolt of a band clamp attaching a solar panel to a torque tube in a pre-assembly state, with the clamp assembly held in place by gravity. This operation permits installation to be quickly completed, with the clamp assemblies ready for routing the cables. Further, in aspects, a tight-fitting hook portion ensures that the clamp assembly cannot simply rotate off the threaded bolt of the band clamp and drop routed electrical cables to the ground.

When installed on the support structure the clamp assembly may route the electrical cables parallel to the torque tube at an offset distance from the torque tube. As the electrical cables are routed and loosely draped along the torque tube the process of pulling the electrical cables across curved saddle surfaces (passageways) and securing/closing the clamp can begin while ensuring a correct amount of tension/slack exists between panel electrical connections and the clamp assemblies. Since the clamping force and bundle diameter are adjustable, the secured point of each electrical cable can be controlled as the installation requires—no need to add cable ties or tape to secure the electrical cable. The secure clamping of the function holds the electrical cable secure regardless of torque tube rotation (clamp right-side up or upside down). The bracket hooks around the threaded bolt between a cylindrical nut and bolt head. The clamp is pre-installed open—ready to secure the electrical cables.

These are but a few examples of how the described clamp assemblies may be used to address technical problems associated with routing electrical cables for photovoltaic system installations. Other examples and implementations are described throughout this document.

First Clamp Assembly

Figure 2:
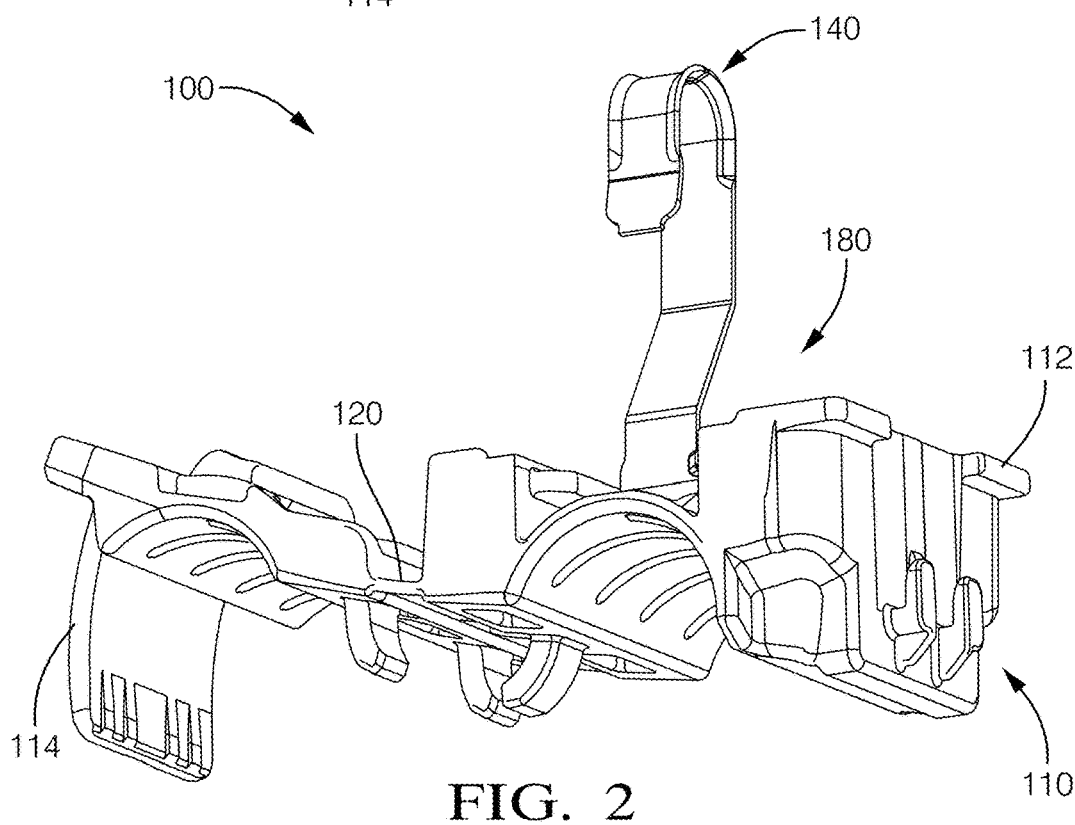
FIG. 2 is a bottom, front perspective view of the first clamp assembly of FIG. 1, which illustrates the clamp in an open position.
Figure 12C:
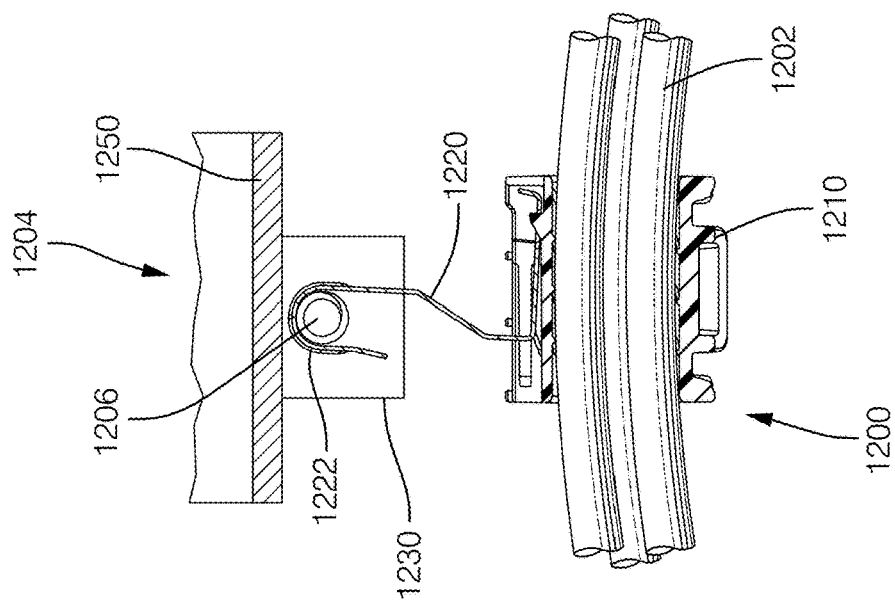
FIGS. 12A, 12B, and 12C are environmental, sequential, cross-sectional views of the first clamp assembly of FIG. 1.
Figure 13:
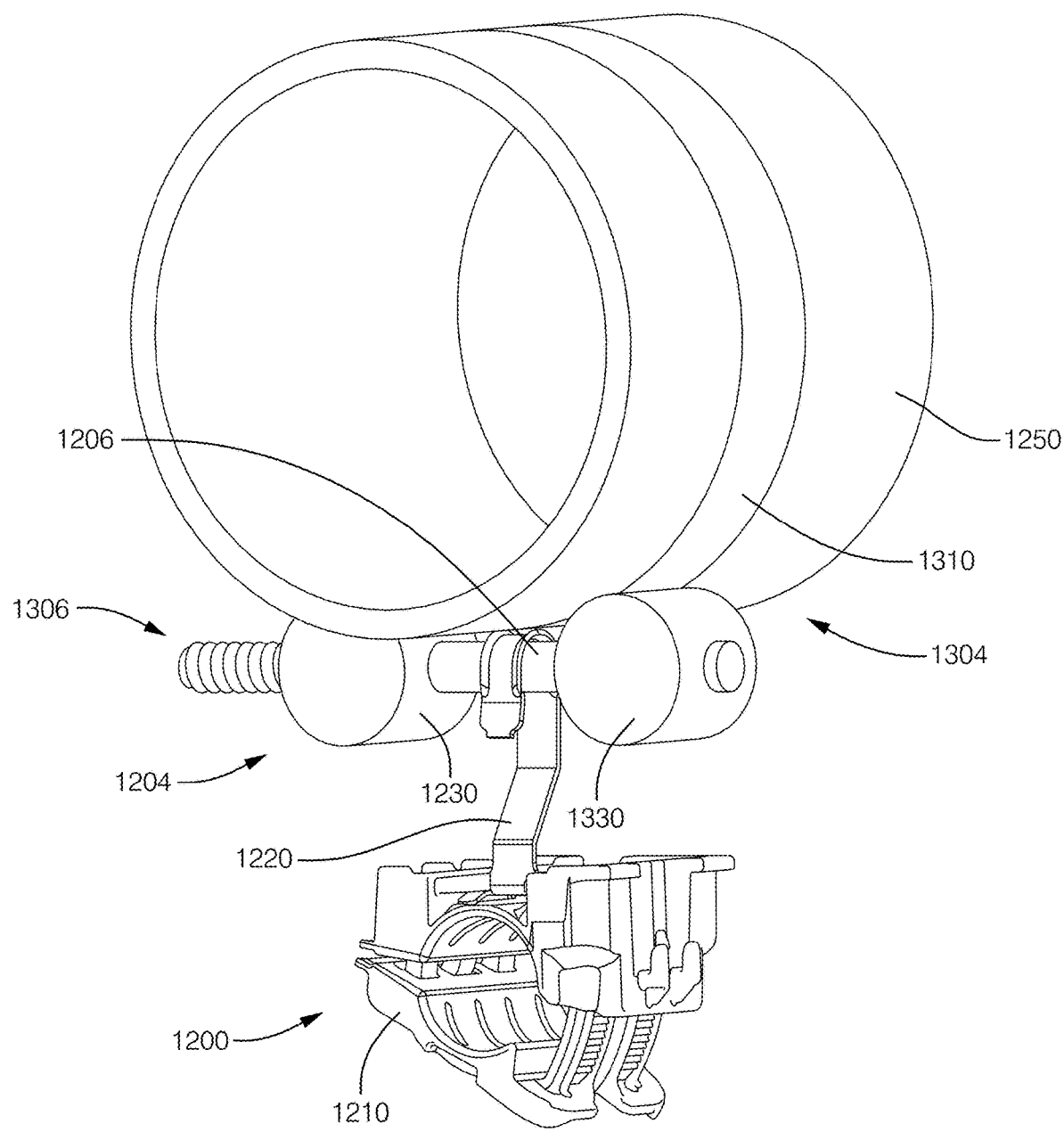
FIG. 13 is a top, front perspective view of the first clamp assembly of FIG. 1 hung from a first support structure.

Illustrated in FIGS. 1 and 2 are top and bottom, front perspective views of a first aspect of a clamp assembly 100. The clamp assembly 100 is configured to attach at least one elongate member 1202 (e.g., wire, electrical cable, hose, tubing, pipe, fiber optic cable, conduit, wire harness assembly, and bundles thereof) to a support structure 1204 (e.g., to a rod 1206 of a band clamp 1304), as illustrated in FIGS. 12C and 13 and described below. The clamp assembly 100 illustrated in FIGS. 1 and 2 includes a clamp 110, a bracket 140, and an interlock mechanism 180. FIG. 1 illustrates the clamp 110 in a closed position, and FIG. 2 illustrates the clamp 110 in an open position.

Figure 3:
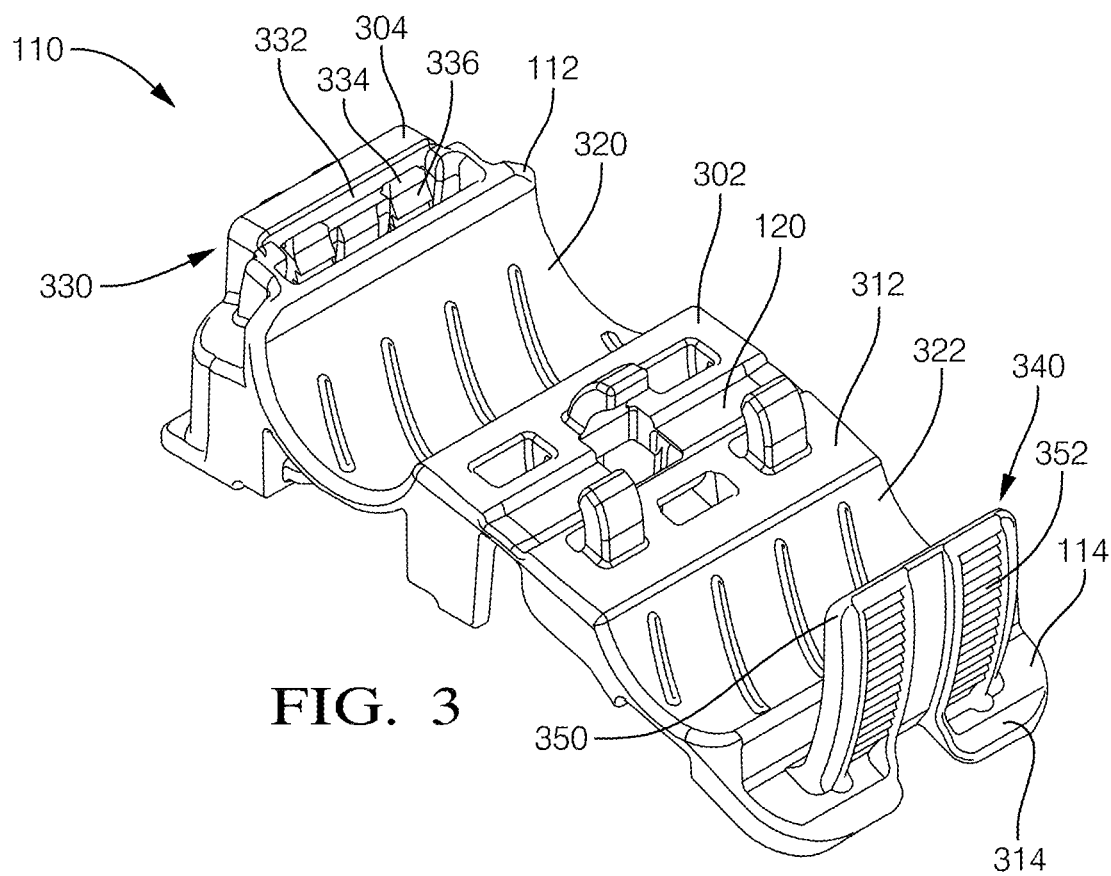
FIG. 3 is a bottom, front perspective view of the clamp of the first clamp assembly of FIG. 1, which illustrates the clamp in the open position.
Figure 4:
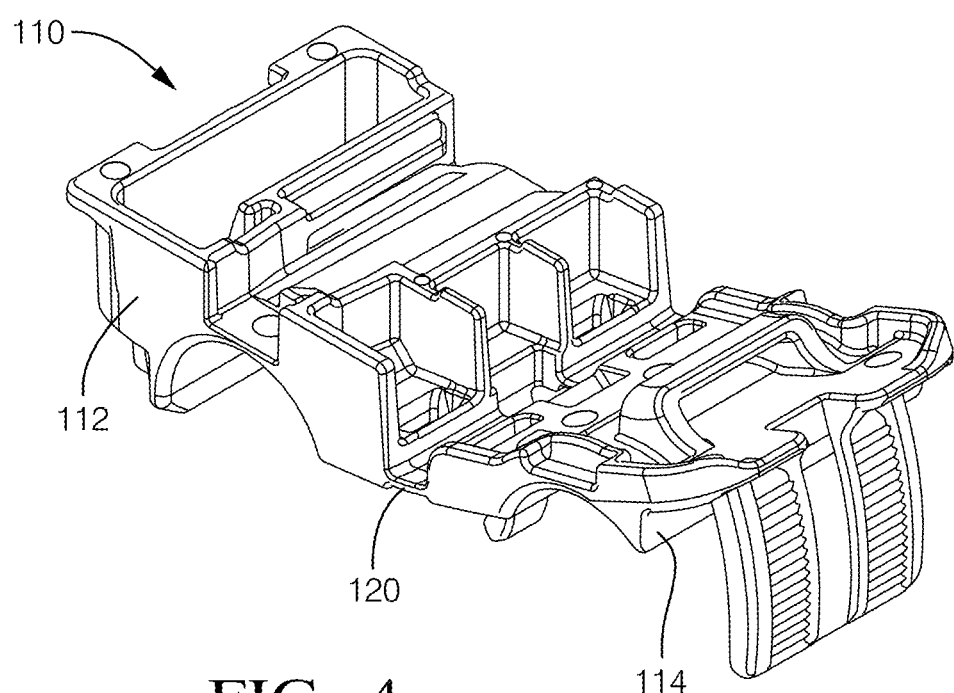
FIG. 4 is a top, rear perspective view of the clamp of the first clamp assembly of FIG. 1, which illustrates the clamp in the open position.
Figure 5:
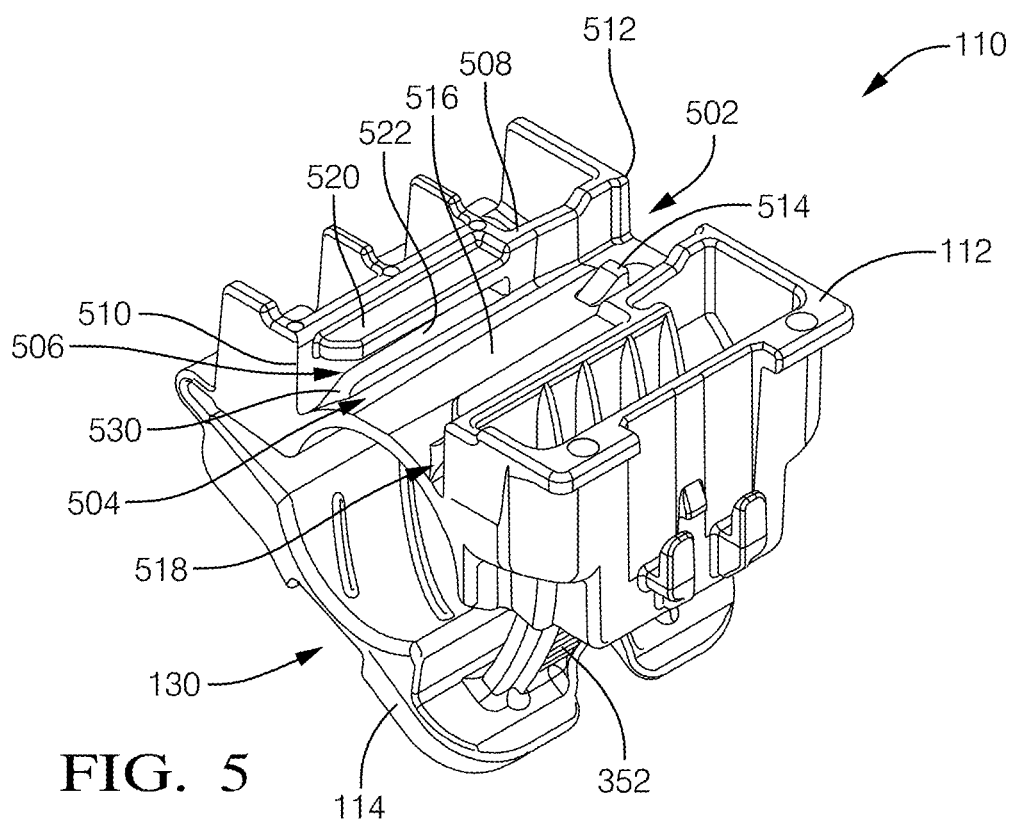
FIG. 5 is a top, front perspective view of the clamp of the first clamp assembly of FIG. 1, which illustrates the clamp in the closed position.
Figure 6:
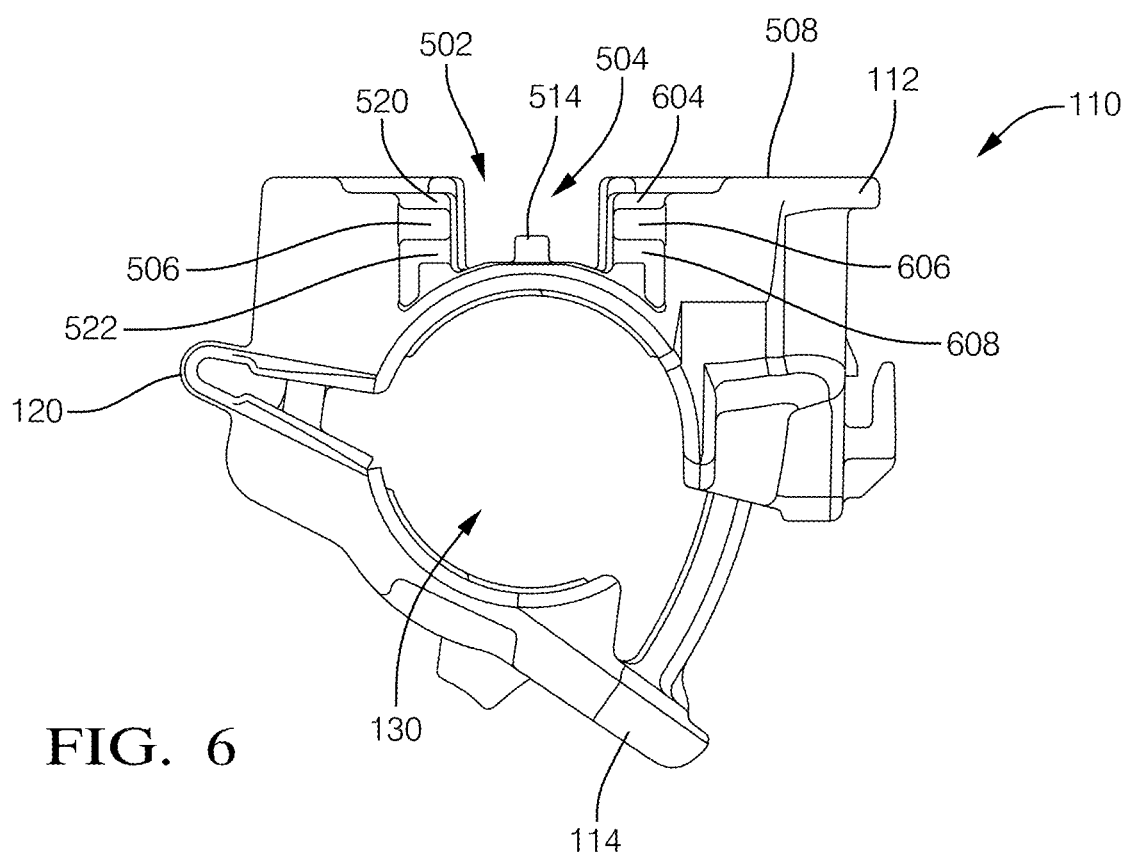
FIG. 6 is a front elevation view of the clamp of the first clamp assembly of FIG. 1, which illustrates the clamp in the closed position.

FIGS. 3-6 illustrate the clamp 110 of the clamp assembly 100. FIG. 3 is a bottom, front perspective view of the clamp 110, FIG. 4 is a top, rear perspective view of the clamp 110, FIG. 5 is a top, front perspective view of the clamp 110, and FIG. 6 is a front elevation view of the clamp 110. FIGS. 3 and 4 illustrate the clamp 110 in the open position, while FIGS. 5 and 6 illustrate the clamp 110 in the closed position.

The clamp 110 is configured to clamp around or to the at least one elongate member 1202, as illustrated in FIG. 12C. In the aspect illustrated in FIGS. 1-6, the clamp 110 has a first clamp member 112 and a second clamp member 114 hingedly connected at and separated by a hinge mechanism 120. The first clamp member 112, hinge mechanism 120, and second clamp member 114 may be integrally formed.

As illustrated in FIGS. 3-6, the first clamp member 112 includes a first end 302 and a second end 304. The second clamp member 114 includes a first end 312 and a second end 314. The hinge mechanism 120 joins the first end 302 of the first clamp member 112 and the first end 312 of the second clamp member 114 hingedly together.

At least one of the first clamp member 112 or the second clamp member 114 defines a passageway 130 configured or shaped to enclose at least a portion of the elongate member 1202. In the aspect illustrated in FIG. 3, the first clamp member 112 includes a first passageway 320 and the second clamp member 114 includes a second passageway 322, and the first and second passageways 320 and 322 align to form the passageway 130 when the clamp 110 is in a closed position, for example, as illustrated in FIGS. 5 and 6. The clamp 110 is illustrated as partially closed in FIGS. 5 and 6. In aspects, the first and second clamp members may define matching curved first and second passageways that are substantially symmetrical and are shaped to enclose at least a portion of the elongate member (e.g., elongate member 1202 in FIG. 12C) to engage and retain the elongate member to a support structure (e.g., support structure 1204 in FIGS. 12A-12C). In aspects, the first and second passageways are semi-circular shaped. The bracket 140 may be attached to the clamp 110 before or after the elongate members are inserted into the passageway. Further, the clamp assembly 100 may be installed on the support structure before or after the elongate members are inserted into the passageway.

The clamp 110 includes a locking mechanism 118 that is configured for locking a position of the first clamp member 112 relative to a position of the second clamp member 114. For example, in the aspect illustrated in FIG. 12C, the position of the first clamp member is locked relative to the position of the second clamp member with the elongate member 1202 held within the passageway.

The locking mechanism 118 may include one or more separate locking mechanisms. For example, in the aspect illustrated in FIG. 3, the first clamp member 112 includes a first locking mechanism 330 and the second clamp member 114 includes a second locking mechanism 340. The first and second locking mechanisms 330 and 340 are configured for locking a position of respective second ends of the first and second clamp members 112 and 114 together around the elongate member 1202, with the elongate member 1202 received in the passageway 130. The position may be locked in one or more locked positions. In this way, the clamp 110 can be adjusted to a receive the one or more elongate members 1202 of varying sizes or diameters therein (e.g., from a diameter of 35 mm to a diameter of 50 mm). For example, as illustrated in FIG. 5, exposed clamp serrations 352 reveal considerable further adjustment remaining available for securing smaller bundle diameters.

A locking mechanism (e.g., first locking mechanism 330, second locking mechanism 340) may include a slotted opening defined in at least one of the clamp members (e.g., first clamp member 112, second clamp member 114). For example, in the aspect illustrated in FIG. 3, the first locking mechanism 330 includes a slotted opening 332 defined in the first clamp member 112. In other aspects, the slotted opening may be defined in the second clamp member 114 or on both clamp members 112 and 114.

The locking mechanism (e.g., first locking mechanism 330, second locking mechanism 340) may further include a wedge-shaped pawl having a plurality of teeth disposed within the slotted opening. For example, the first locking mechanism 330 illustrated in FIG. 3 includes a wedge-shaped pawl 334 having a plurality of teeth 336. In other aspects, the second locking mechanism 340 may include the wedge-shaped pawl having a plurality of teeth or both clamp members 112 and 114 may include the wedge-shaped pawl.

The locking mechanism (e.g., first locking mechanism 330, second locking mechanism 340) may further include a tongue member projecting from a clamp member (e.g., first clamp member 112, second clamp member 114). For example, the first locking mechanism 330 includes a tongue member 350 projecting from the second clamp member 114, as illustrated in FIG. 3. In other aspects, a tongue member may be located on the other clamp member 112 or on both clamp members 112 and 114. The tongue member 350 may further includes a plurality of serrations (e.g., serrations 352) extending along a length of the tongue member 350 and across a width of the tongue member 350. The tongue member 350 may be configured to be received in the slotted opening 332 defined in the first clamp member 112. In aspects, the attachment may be releasable. The plurality of teeth (e.g., teeth 336) may be configured to interlock with the plurality of serrations (e.g., serrations 352) when the tongue member 350 is inserted into the slotted opening 332, as illustrated in FIGS. 5 and 6. In operation, the insertion of the tongue member 350 into the slotted opening 332 enables the clamp 110 to lock around the elongate member therein 1202, as illustrated in FIG. 12C.

The clamp assembly 100 further includes the interlock mechanism 180, which is configured for connecting a mounting member 502 (illustrated in FIG. 5) of the clamp 110 and the base 702 of the bracket 140 together. In aspects, the connection may be releasable. The interlock mechanism 180 may include the mounting member 502 of the clamp 110 and a receiver 710 of the bracket 140. In aspects, this attachment is releasable, enabling the bracket 140 to be attached to and detached from the clamp 110.

The mounting member 502 is defined in at least one of the first clamp member 112 or the second clamp member 114. In the aspect of FIG. 5, the mounting member 502 is defined in the first clamp member 112. The mounting member 502 is configured to connect with the bracket 140. The mounting member 502 defines a mounting insert channel 504 configured to receive a clamp mounting attachment 704 of the bracket 140. In the aspect illustrated in FIGS. 5 and 6, the mounting insert channel 504 includes a first slot 506 (e.g., an elongated T-slot) defined in a bottom side 508 of at least one of the first clamp member 112 or the second clamp member 114. The first slot 506 is open at a first end 510 and may be closed at a second end 512. The mounting insert channel 504 further includes a second slot 606 (e.g., an elongated T-slot) defined in a bottom side 508 of at least one of the first clamp member 112 or the second clamp member 114. The second slot 606 is open at a first end 518 and may be closed at a second end.

In the aspect illustrated in FIGS. 5 and 6, a retention tab 514 is located within the mounting insert channel 504, extending upwards from a base surface 516. The mounting insert channel 504 includes a pair of laterally extending upper flanges (first upper flange 520, second upper flange 604) opposing a pair of laterally extending lower flanges (first lower flange 522, second lower flange 608), the respective upper flanges facing the respective lower flanges. In aspects, the lower flanges respectively include a first ramp 530 and a second ramp 1002 adjacent the open first ends and facing the upper flanges. The pairs of upper and lower flanges define the first slot 506 and a second slot 606 opened at first ends and configured for receiving the clamp mounting attachment 704 of the base 702 therein. A height of the lower flanges above the base surface 516 may be greater than a height of the base 702 to a tip of a bent runner 730.

The mounting member 502 includes the retention tab 514 that extends from the base surface 516 of the clamp member (e.g., first clamp member 112, second clamp member 114). The base 702 includes the receiver 710 configured to receive the retention tab 514. The receiver 710 is defined in a first portion 708. The interlock mechanism 180 includes the retention tab 514 and the receiver 710.

Figure 7:
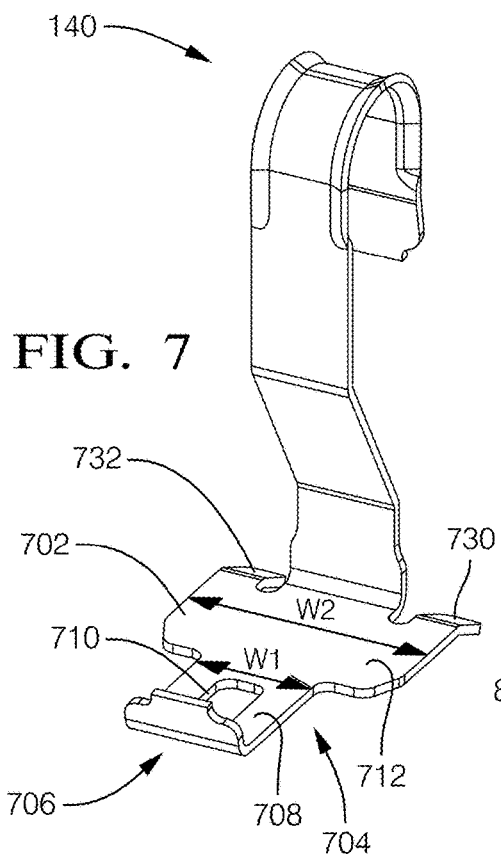
FIG. 7 is a top, rear perspective view of a bracket of the first clamp assembly of FIG. 1.
Figure 8:
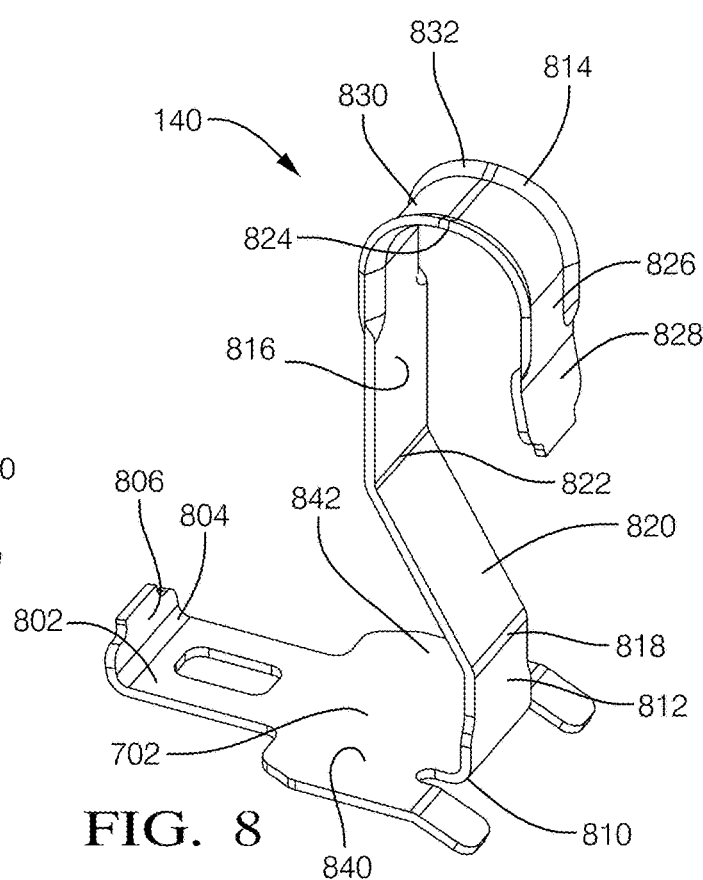
FIG. 8 is a top, left-side perspective view of the bracket of FIG. 7.
Figure 9:
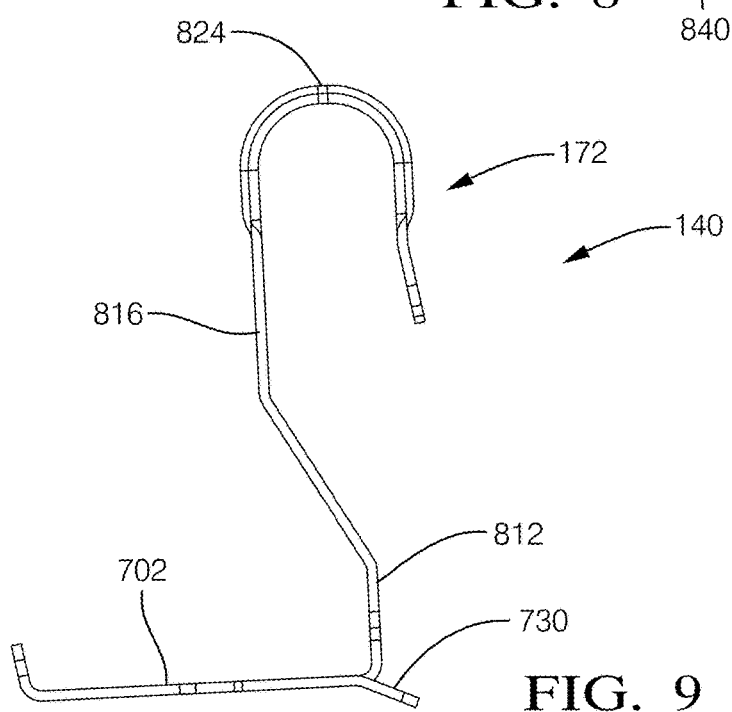
FIG. 9 is a left-side elevation view of the bracket of FIG. 7.
Figure 10:
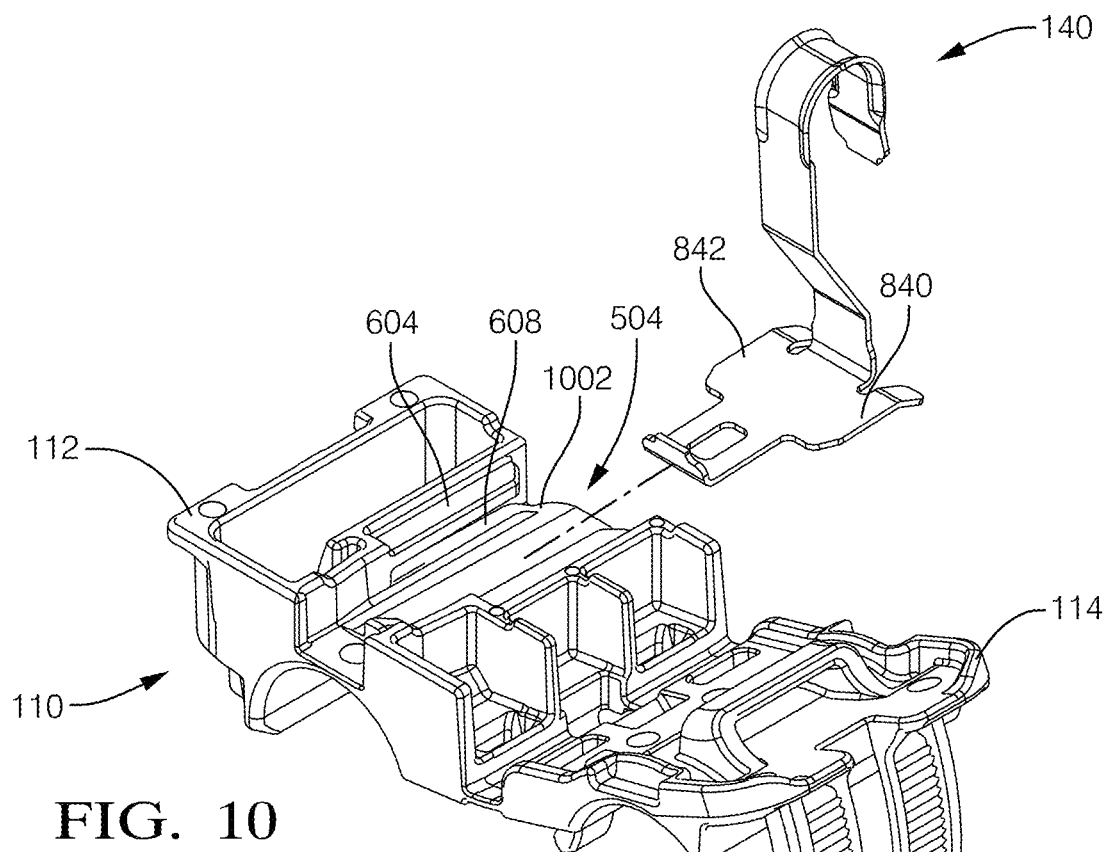
FIG. 10 is an exploded, top, front perspective view of the first clamp assembly of FIG. 1, which illustrates the clamp in the open position.

The clamp assembly 100 includes the bracket 140, which is further illustrated in FIGS. 7-10, where FIG. 7 is a top, rear perspective view of the bracket 140, FIG. 8 is a top, left-side perspective view of the bracket 140, FIG. 9 is a left-side elevation view of the bracket 140, and FIG. 10 is an exploded, top, front perspective view of the first clamp assembly of FIG. 1, which illustrates the clamp 110 in the open position. The bracket 140 includes the base 702 that is configured for connecting with the clamp 110. In aspects, such as is illustrated in FIGS. 7-10, the base 702 includes the clamp mounting attachment 704 that is configured for receipt into the mounting insert channel 504 defined in the mounting member 502 (illustrated in FIG. 5) to connect the bracket 140 with the clamp 110. The base 702 may include a tail end 706 that is configured to be slid through the open first end 510 and into the first slot 506 of the mounting insert channel 504. In FIG. 10, as the base 702 is slid further into the mounting insert channel 504, the tail end 706 is configured to contact the retention tab 514, causing the first portion 708 of the base 702 to deflect upwards, enabling the retention tab 514 to be received into the receiver 710 defined in the base 702. Such an engagement can be a snap-and-latch design. In such a position, the clamp mounting attachment 704 of the bracket 140 is locked onto the first clamp member 112 at the mounting member 502, as illustrated in FIGS. 1, 2, and 13.

The base 702 further includes a release mechanism 802 that is configured to release the retention tab 514 from the receiver 710 to permit the bracket 140 to be unlocked from the clamp 110. In aspects, the release mechanism 802 is defined by an approximate orthogonal upward bend 804 in the base 702 that forms an upwardly extending tail leg 806, as illustrated in FIG. 8. In such a configuration, the release mechanism 802 may be digitally or mechanically manipulated through applying an upward force to the release mechanism 802 to enable the retention tab 514 to be disengaged from the receiver 710 and the base 702 to be slid out of the first slot 506. In aspects, the receiver 710 includes an orifice or the like defined in or through the base 702.

The first portion 708 of the base 702 may have a first width (w1) and a second portion 712 may have a second width (w2). The first width may be narrower than the second width. In this way, the first portion 708 can flex upward relative to the second portion 712, permitting the release mechanism 802 to be more easily digitally or mechanically manipulated through applying an upward force to the release mechanism 802 to enable the retention tab 514 to be disengaged from the receiver 710 and the base 702 to be slid out of the first slot 506. In this way, the first portion 708 can flex upwards allowing low insertion force over a ramp portion of the retention tab 514, while providing a higher withdrawal strength when in tension with the receiver 710 engages the retention tab 514.

The base 702 may include at least one first bent runner 730 or second bent runner 732 that extends obliquely to a plane of the base 702, the first bent runner 730 configured to mate with the first ramp 530 of the first lower flange 522 and/or the second bent runner 732 configured to mate with a second ramp 1002 of the second lower flange 608 of the mounting insert channel 504 to create a slight interference for a non-rattling fit. In this way, when the clamp mounting attachment 704 is inserted into the first slot 506, the bent runner 730, 732 contacts the lower flange and/or ramp and flexes to cause a portion of an upper surface of the base 702 to contact the underside of the first upper flange 520 and the second upper flange 604, operating as a spring clip for limiting movement of the bracket 140 relative to the first clamp member 112. In aspects, the bent runner 730, 732 extends in a downward direction away from the base 702. The bent runner may include sharp die cut edges that dig into the ramp of the lower flange. In aspects, the bent runner 730, 732 may further limit the insertion of the clamp mounting attachment 704 into the mounting insert channel 504.

The bracket 140 further includes a support structure connector 170 that is configured for connecting and/or attaching the bracket 140 to a support structure (e.g., support structure 1204). For example, the support structure connector 170 may include a hook portion 172, as illustrated in FIGS. 7-10. In aspects, the connection/attachment may be releasable. In these figures, the hook portion 172 is illustrated as configured for hanging on an elongated portion of the support structure 1204, such as a rod 1206 of FIGS. 12A-12C and 13. In aspects, the hook portion 172 may be generally C-shaped.

As illustrated in the aspect of FIGS. 7-9, the support structure connector 170 may include, from the base 702, an approximate orthogonal upward first bend 810 forming an upwardly extending first leg 812. The first leg 812 includes a hook bend 814 that is angled outwardly from a plane of the first leg 812. The hook bend 814 forms the hook portion 172 of the support structure connector 170.

The first leg 812 may include at least one dogleg or other non-planar structure. For example, as illustrated in FIGS. 7-10, the first leg 812 includes an upwardly extending second leg 816. From the first leg 812, a second bend 818 forms a dogleg segment 820 that is angled inwardly from the plane of the first leg 812 at an angle, the dogleg segment 820 having a third bend 822 that is angled outwardly from a plane of the dogleg segment 820 at an angle. The third bend 822 forms the extending second leg 816, which is oriented generally perpendicular to the plane of the first leg 812. The second leg 816 has the hook bend 814 that is angled outwardly from a plane of the second leg 816 and which forms the hook portion 172.

The second leg 816 may be spaced apart from and oriented generally perpendicular to the plane of the first leg 812, as illustrated in FIGS. 7-9. In such a configuration, a center 824 of the hook portion 172 is located inwards of the first leg 812. The hook portion 172 may include a tip bend 826 that is angled outwardly from the hook portion 172 to form a ramp portion 828. In this way, the hook portion 172 can be more easily hooked onto the support structure 1204, as described below with respect to FIGS. 12A-12C. One or more side edges of the hook portion 172 may be radiused to include one or more of a first radiused edge 830 or a second radiused edge 832. In this way, the hook portion 172 minimizes scratches to solar tracking components and installers' hands when installed, for example, as described below with respect to FIGS. 12A-12C.

The second portion 712 of the base 702 defines a first wing 840 on a first side of the base 702 and a second wing 842 on a second side of the base 702, the first and second wings 840 and 842 configured for receipt into the respective first slot 506 and second slot 606 of the mounting insert channel 504.

Figure 11:
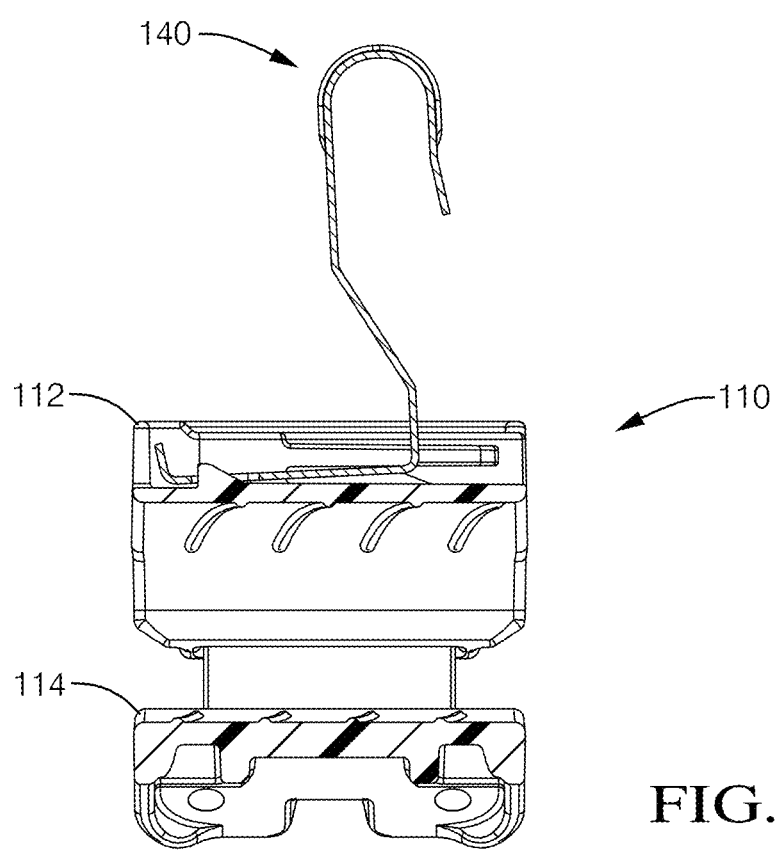
FIG. 11 is a cross-section view of the bracket of FIG. 1 along lines 11-11.
Figure 12B:
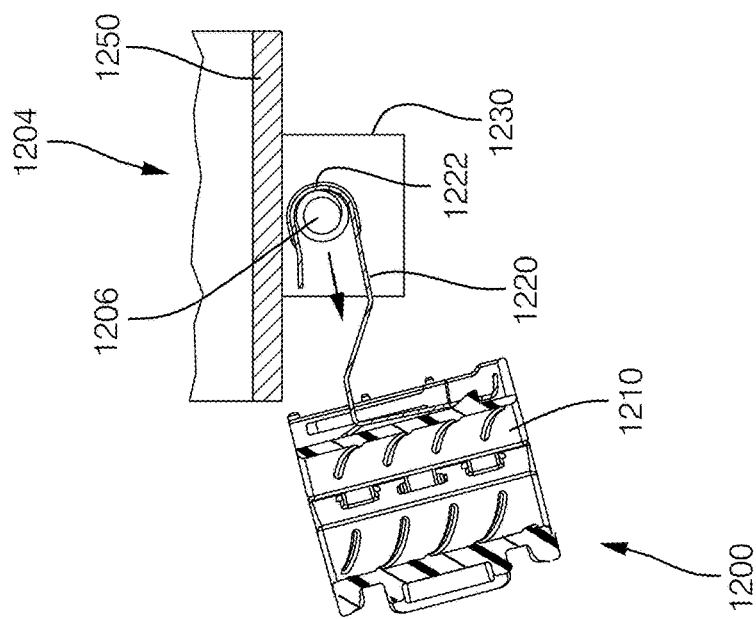
Figure 12A:
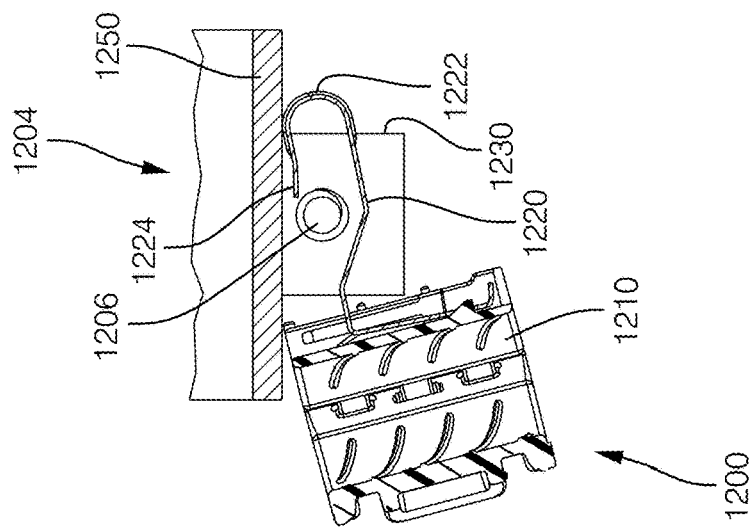

FIG. 11 illustrates a cross-section view along line 11-11 of FIG. 1. FIGS. 12A-12C illustrate an example operation of installing a clamp assembly 1200 onto a support structure 1204. FIG. 13 includes a further view, as assembled. The clamp assembly 1200 includes a clamp 1210 and a bracket 1220. The bracket 1220 includes a hook portion 1222 configured for receiving the support structure 1204. The support structure 1204 includes a torque tube 1250 and a band clamp 1304. The band clamp 1304 includes a first end collar 1230, a second end collar 1330, a tangentially arranged rod and nut connector 1306 that extends between the first and second end collars 1230 and 1330, and a flexible metal strap 1310. The flexible metal strap 1310 extends around the torque tube 1250, from the first end collar 1230 to the second end collar 1330. The rod and nut connector 1306 enables the band clamp 1304 to be adjustably tightened around the torque tube 1250. In one example, the rod and nut connector 1306 includes a T-bolt having a head in the first end collar 1230, and a nut is defined in the second end collar 1330. The rod and nut connector 1306 includes a rod 1206 that may be threaded.

In FIGS. 12A-12C, the torque tube 1250 is illustrated in partial cross-section. These FIGURES illustrate a tight fit between the hook portion 1222 of the bracket 1220 and the torque tube 1250. In FIG. 12A, a tip 1224 of the hook portion 1222 is positioned adjacent the rod 1206. In FIG. 12B, the hook portion 1222 is then looped onto the rod 1206 and is pulled until the hook portion 1222 is seated on the rod 1206. Gravity can be allowed to rotate the clamp assembly 1200 around the rod 1206, as is illustrated in FIG. 12C. In such a configuration, as the torque tube 1250 rotates (e.g., through the use of a solar tracker), the clamp assembly 1200 is permitted to rotate relative to the rod 1206. In this way, the routed elongate members 1202 (illustrated in FIG. 12C) remain in position as the torque tube 1250 and an attached solar panel move relative to the Sun. While these FIGURES illustrate the clamp assembly 1200 as closed, the clamp assembly 1200 can be pre-installed open and ready to secure the elongate member(s) 1202 therein.

Second Clamp Assembly

Figure 14:
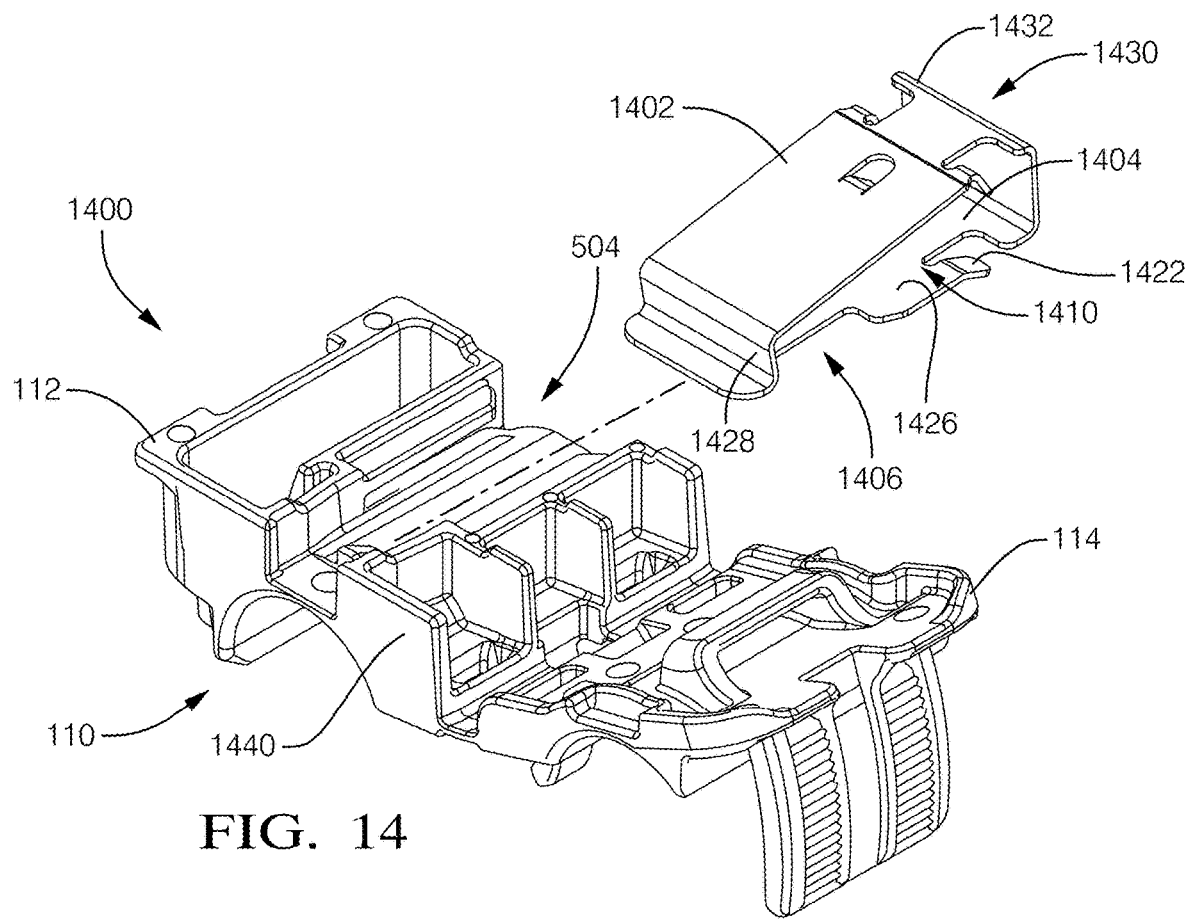
FIG. 14 is an exploded, top, front perspective view of a second clamp assembly including a second bracket, which illustrates the second clamp in the open position.
Figure 15:
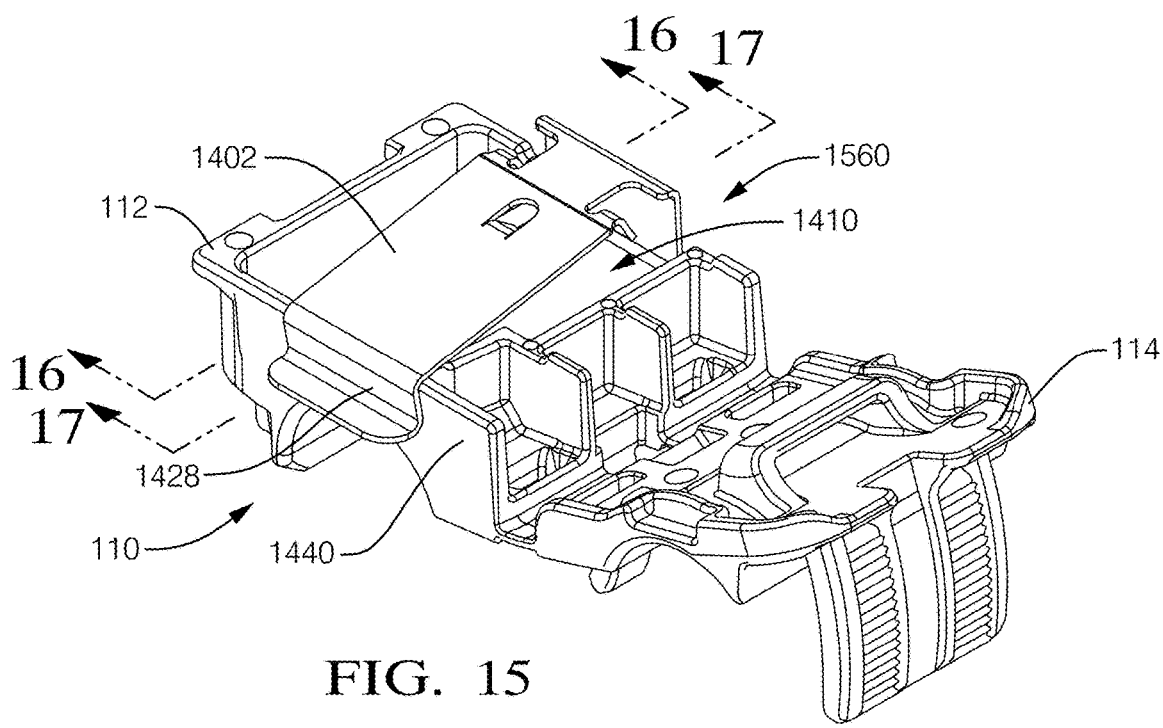
FIG. 15 is an assembled, top, front perspective view of the second clamp assembly of FIG. 14.
Figure 16:
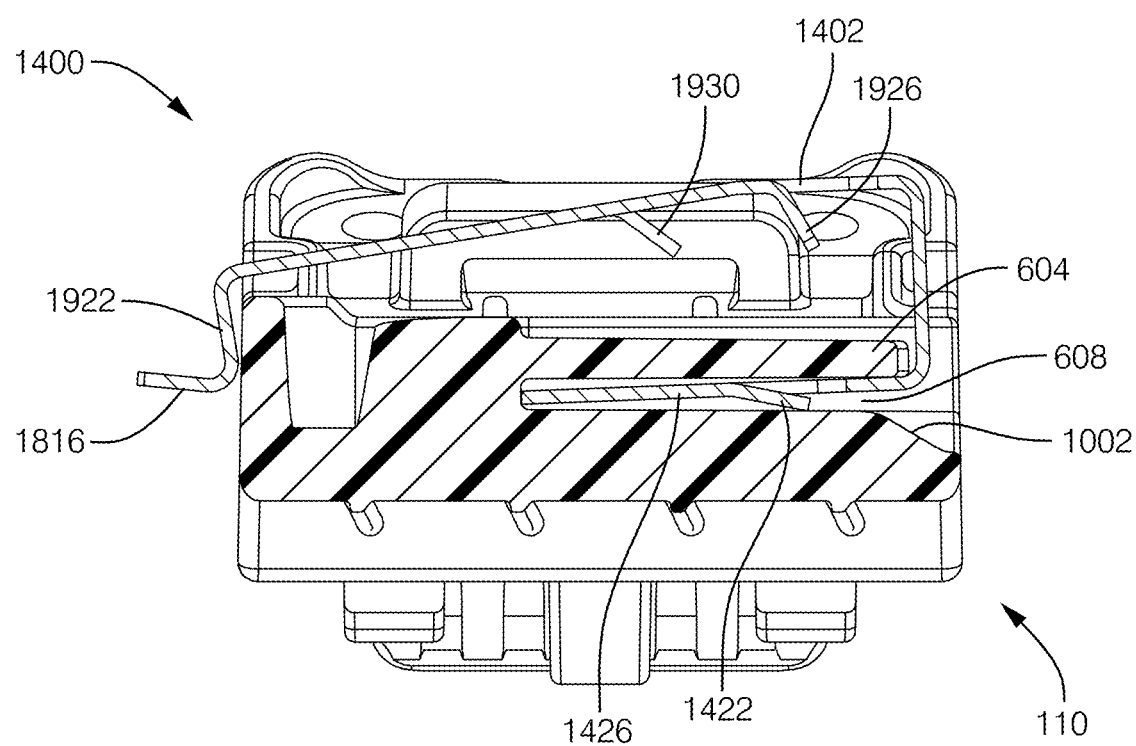
FIG. 16 is a sectional view of the second clamp assembly of FIG. 14 along lines 16-16 in FIG. 15.
Figure 17:
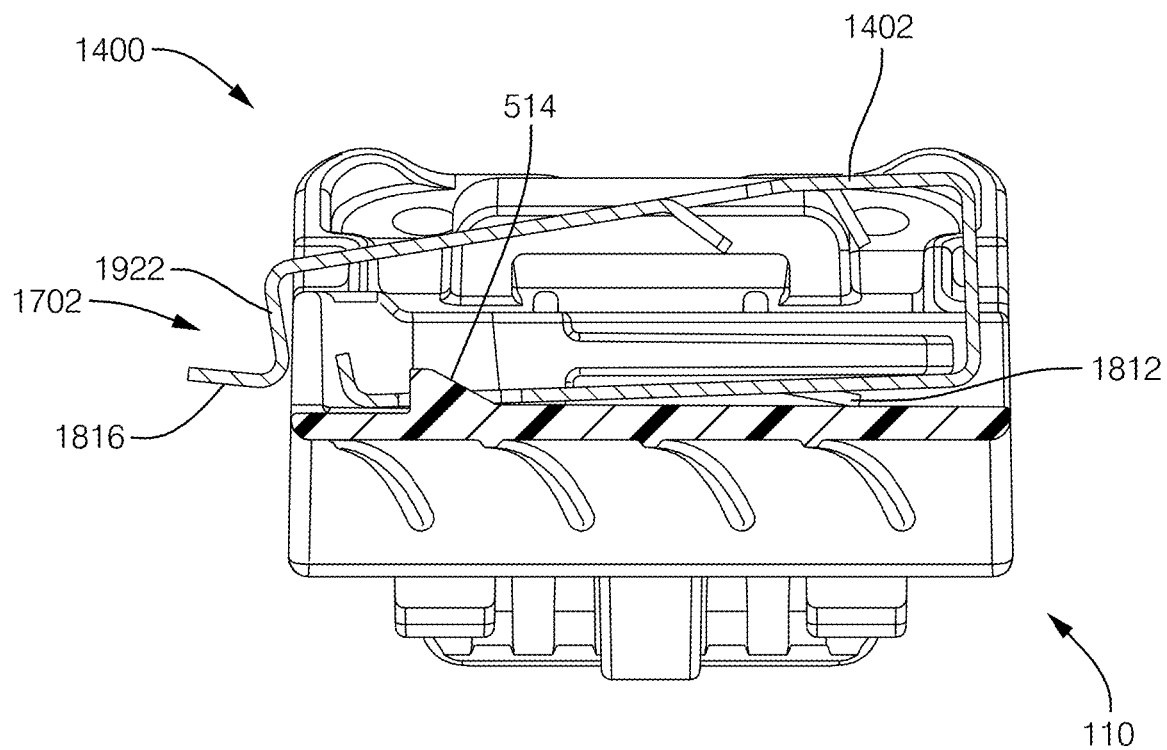
FIG. 17 is a sectional view of the second clamp assembly of FIG. 14 along lines 17-17 in FIG. 15.
Figure 18:
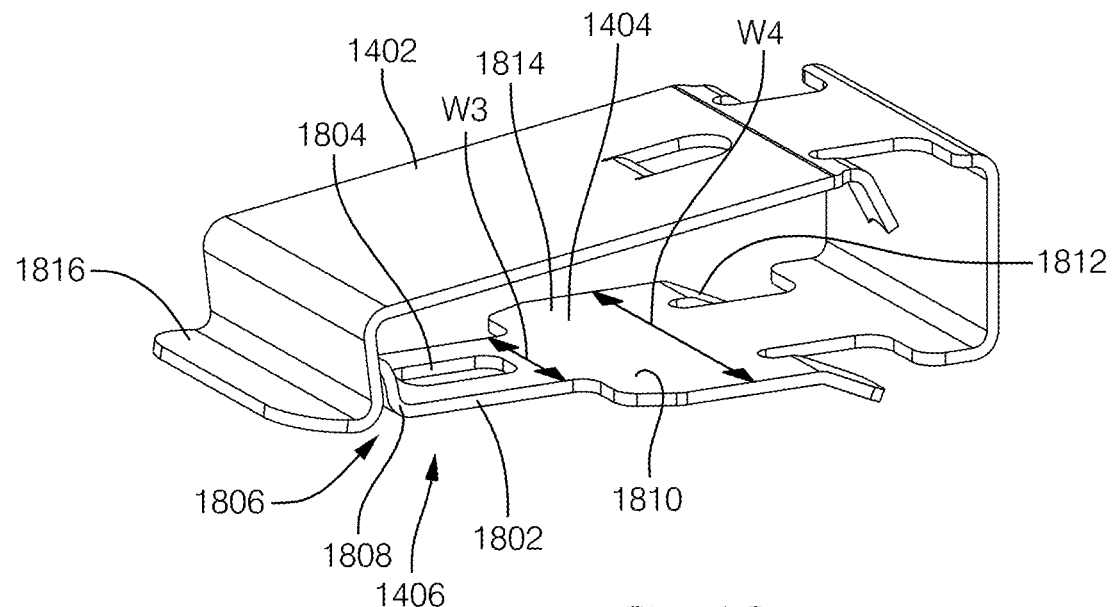
FIG. 18 is top, rear perspective view of the second clamp assembly of FIG. 14.
Figure 19:
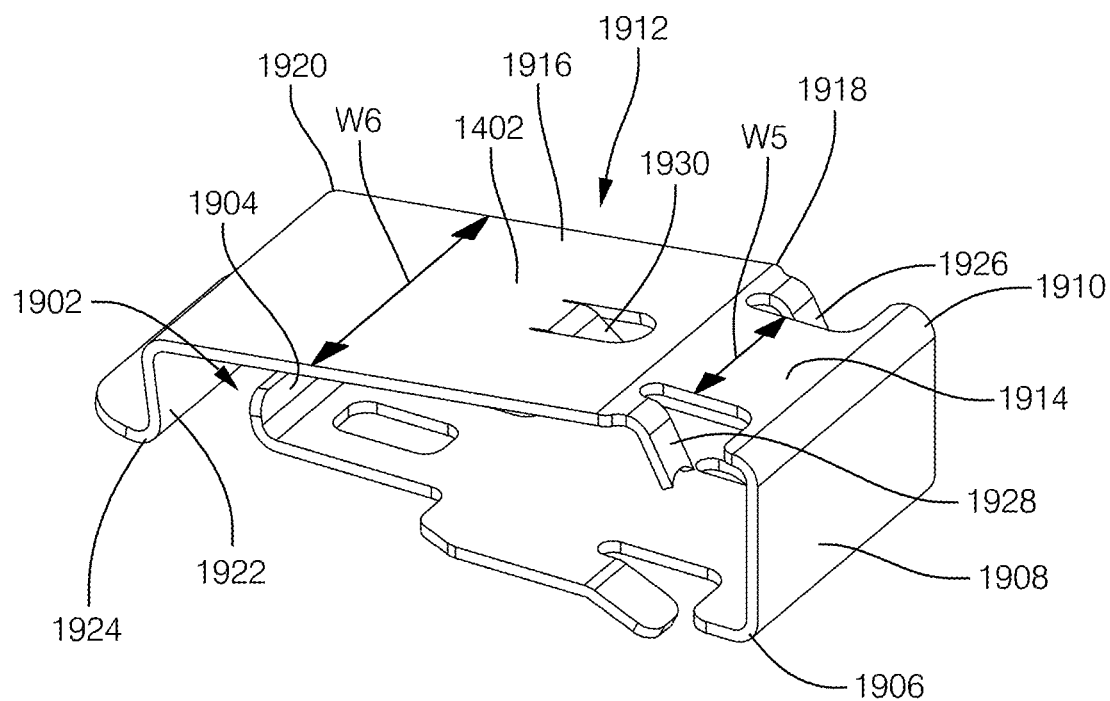
FIG. 19 is top, front perspective view of the second clamp assembly of FIG. 14.
Figure 20:
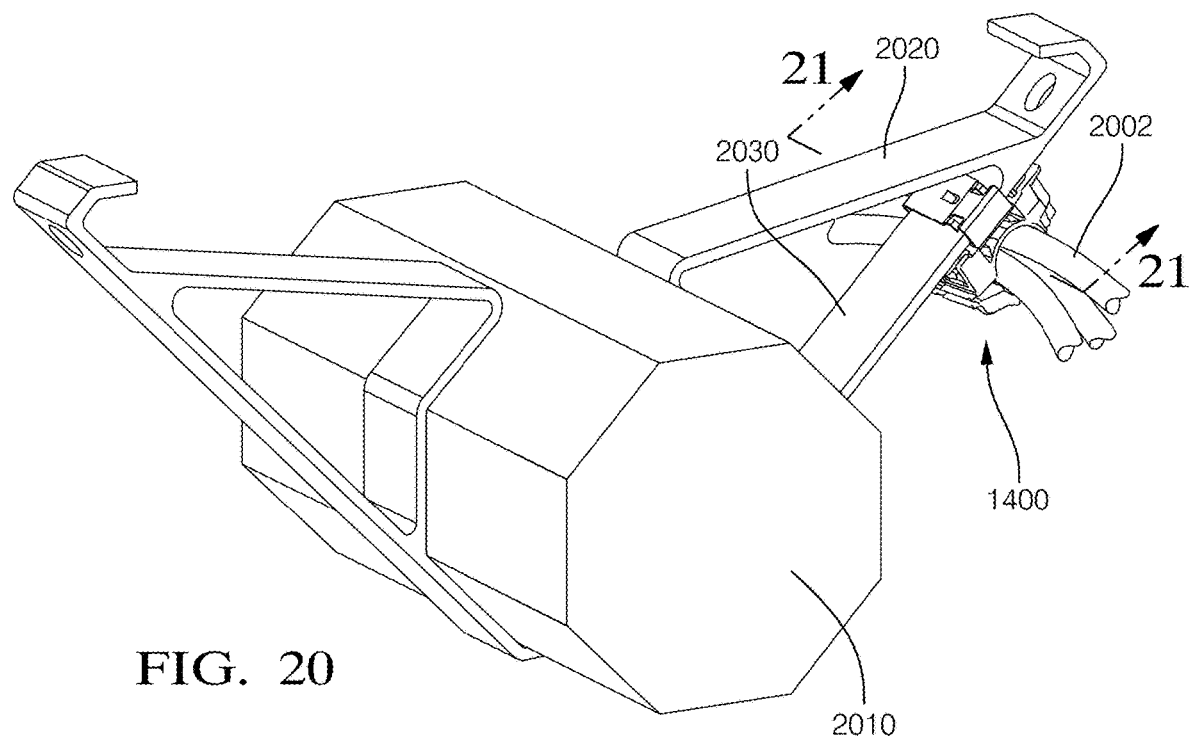
FIG. 20 is a top, front perspective view of the second clamp assembly of FIG. 14, illustrated as attached to second support structure.
Figure 21:
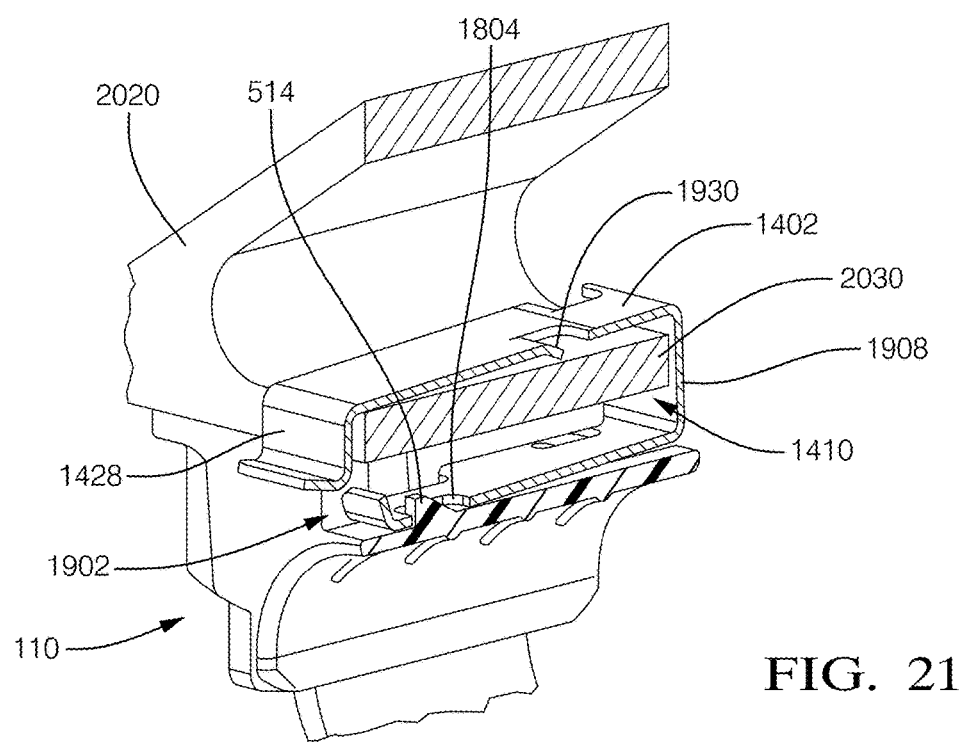
FIG. 21 is a perspective, sectional view of the second clamp assembly of FIG. 20 along lines 21-21.

Referring now to FIGS. 14-21, a second clamp assembly 1400 is illustrated. FIG. 14 is an exploded, top, front perspective view and FIG. 15 is an assembled, top, front perspective view. FIGS. 14 and 15 illustrate the clamp 110 in the open position. FIG. 16 is a sectional view along lines 16-16 in FIG. 15, FIG. 17 is a sectional view along lines 17-17 in FIG. 15, FIG. 18 is a top, rear perspective view, FIG. 19 is a top, front perspective view, FIG. 20 is a top, front perspective view, and FIG. 21 is a perspective, sectional view along lines 21-21 in FIG. 20.

The second clamp assembly 1400 is similar to the first clamp assembly 100 illustrated in FIGS. 1-13 and described above, except as detailed below. Thus, the second clamp assembly 1400 includes a clamp (e.g., clamp 110 of FIGS. 1-6 and 10), a bracket 1402, and an interlock mechanism 1560. The interlock mechanism 1560 is configured for connecting a mounting member 502 of the clamp 110 and a base 1404 of the bracket 1402 together. In aspects, the connection may be releasable. In the aspect illustrated in FIGS. 14-21, the interlock mechanism 1560 includes the mounting member 502 of the clamp 110 and a receiver 1804 of the bracket 1402. In aspects, this attachment is releasable, enabling the bracket 1402 to be attached to and detached from the clamp 110.

The bracket 1402 includes a base 1404 that is configured for connecting with the clamp 110. In aspects, the base 1404 includes a clamp mounting attachment 1406 that is configured for receipt into a mounting insert channel 504 defined in the mounting member 502 to connect the bracket 1402 with the clamp 110. The base 1404 may include a tail end 1902 that is configured to be slid through an open first end 510 and into a first slot 506 of the mounting insert channel 504.

In FIGS. 14 and 15, as the base 1404 is slid further into the mounting insert channel 504, the tail end 1902 is configured to contact a retention tab 514 (e.g., at a ramp portion of the retention tab 514), causing a first portion 1802 of the base 1404 to deflect upwards, enabling the retention tab 514 to be received into the receiver 1804 which is defined in the base 1404, as illustrated in FIG. 21. Such an engagement can be a snap and latch design. In such a position, the clamp mounting attachment 1406 of the bracket 1402 is locked onto a first clamp member 112 at the mounting member 502.

The base 1404 further includes a release mechanism 1806 that is configured to release the retention tab 514 from the receiver 1804 to permit the bracket 1402 to be unlocked from the clamp 110. In aspects, the release mechanism 1806 is defined by an approximate orthogonal upward bend 1808 in the base 1404 that forms an upwardly extending tail leg 1904. In such a configuration, the release mechanism 1806 can be digitally or mechanically manipulated through applying an upward force to the release mechanism 1806 to enable the retention tab 514 to be disengaged from the receiver 1804 and the base 1404 slid out of the first slot 506. In aspects, the receiver 1804 includes an orifice or the like defined in or through the base 1404.

The first portion 1802 of the base 1404 may have a first width (w3) and a second portion 1810 may have a second width (w4), as illustrated in FIG. 18. The first width may be narrower than the second width. In this way, the first portion 1802 can flex upward relative to the second portion 1810, permitting the release mechanism 1806 to be more easily digitally or mechanically manipulated through applying an upward force to the release mechanism 1806 to enable the retention tab 514 to be disengaged from the receiver 1804 and the base 1404 to be slid out of the first slot 506. In this way, the first portion 1802 can flex upwards allowing low insertion force over a ramp portion of the retention tab 514, while providing a higher withdrawal strength when in tension with the receiver 1804 engages the retention tab 514.

The second portion 1810 of the base 1404 defines a first wing 1426 on a first side of the base 1404 and a second wing 1814 on a second side of the base 1404. The first wing 1426 and the second wing 1814 are configured for receipt into the respective first slot 506 and second slot 606, respectively, of the mounting insert channel 504.

The base 1404 may include at least one first bent runner 1422 or second bent runner 1812 that extends obliquely to a plane of the base 1404. In this way, when the clamp mounting attachment 1406 is inserted into the first slot 506, the bent runner 1422, 1812 contacts a lower flange and/or ramp and flexes to cause a portion of an upper surface of the base 1404 to contact the underside of a first upper flange 520 and a second upper flange 604, operating as a spring clip for limiting movement of the bracket 1402 relative to the first clamp member 112. In aspects, the bent runner extends in a downward direction away from the base 1404. The bent runner may further limit the insertion of the clamp mounting attachment into the mounting insert channel.

The bracket 1402 further includes a support structure connector 1430 that is configured for connecting and/or attaching the bracket 1402 to a support structure (e.g., arm 2030 illustrated in FIGS. 20 and 21). In aspects, the connection/attachment may be releasable.

In aspects, the support structure connector 1430 is a clip 1432 that defines a holder 1410 configured for receiving a portion of a support structure therein, enabling the support structure connector 1430 to be connected to the support structure. In aspects, the support structure connector 1430 may include, from the base 1404, an approximate orthogonal upward first bend 1906 forming an upwardly extending first leg 1908. The first leg 1908 may include an approximate orthogonal rearward second bend 1910 forming a rearwardly extending second leg 1912. The second leg 1912 may be angled inwardly from a plane of the first leg 1908 at an angle. The second leg 1912 may include a first cover segment 1914 and a second cover segment 1916, the first cover segment 1914 oriented generally parallel to a plane of the base 1404. The first cover segment 1914 and the second cover segment 1916 may be separated by a downward segment bend 1918, the segment bend 1918 angled inwardly from a plane of the first cover segment 1914 at an angle. The segment bend 1918 forms the inwardly extending second cover segment 1916 oriented generally oblique to the plane of the first cover segment 1914.

The bracket 1402 further defines a locking flange 1428 configured for locking engagement with the first clamp member 112. For example, when the bracket 1402 is received into the mounting insert channel 504, the locking flange 1428 may snap over an outer sidewall 1440 of the first clamp member 112, as illustrated in FIGS. 15-17.

In aspects, the first leg 1908, first cover segment 1914, second cover segment 1916, and/or locking flange 1428 define the holder 1410. The holder 1410 is configured for receiving an arm 2030 of the support structure (e.g., mounting bracket 2020) therein. The locking flange 1428 can be manipulated away from the base 1404 to enable the bracket 1402 to be slid onto the arm 2030 of a mounting bracket 2020, as illustrated in FIGS. 20 and 21. In such a configuration, the arm 2030 is received into the holder 1410.

The first cover segment 1914 of the second leg 1912 may have a first width (w5), and the second cover segment 1916 may have a second width (w6). The first width may be narrower than the second width. In this way, the second cover segment 1916 can flex upward relative to the first cover segment 1914, permitting the locking flange 1428 to be more easily digitally or mechanically manipulated through applying an upward force to the locking flange 1428 to enable the locking flange 1428 to be disconnected from its engagement with the outer sidewall 1440 of the first clamp member 112, as illustrated in FIGS. 15-17, and to enable the bracket 1402 to be slid off the arm 2030. Likewise, the process can be reversed to enable the bracket 1402 to be slid onto the arm 2030.

The second leg 1912 (e.g., the second cover segment 1916 of the second leg 1912) may include a third bend 1920 that forms a downwardly extending third leg 1922 that may be oriented generally parallel to the plane of the upwardly extending first leg 1908. In aspects, the third leg 1922 is generally orthogonal to the second leg 1912 (e.g., the second cover segment 1916 of the second leg 1912). The third leg 1922 may include a fourth bend 1924. The fourth bend 1924 may be angled outwardly from a plane of the second leg 1912, the fourth bend 1924 forming a fourth leg 1816, which may be configured as a ramp portion.

In aspects, at least one inwardly extending tooth (e.g., tooth 1926, tooth 1928, tooth 1930) is formed in the second leg 1912, such as is illustrated in FIGS. 18, 19, and 21. A tooth may operate as a sharp metal barb configured to secure a position of the bracket 1402 on the mounting bracket 2020, for example, by digging into a softer surface metal brackets and/or into softer surface coated or painted brackets, as is illustrated by an inwardly extending tooth 1930 biting into (biting engagement) a surface of the arm 2030 in FIG. 21. FIG. 21 further illustrates the arm 2030 of the mounting bracket 2020 placed between the first leg 1908 and the locking flange 1428 of the bracket 1402.

In FIGS. 20 and 21, a torque tube 2010 is polygonal in cross-section and the polygonal mounting bracket 2020 shaped to engage the sides of the torque tube (e.g., to snap or slide onto the torque tube) is used to attach a solar panel to the torque tube 2010. A support surface (e.g., arm 2030) of the mounting bracket 2020 provides a structure and anchoring point for attachment of the second clamp assembly 1400 for the routing of photovoltaic cables 2002. In FIG. 20, the support structure connector 1430 of the second clamp assembly 1400 includes the clip 1432 that defines the holder 1410 configured for receiving a portion of the polygonal mounting bracket 2020 therein (e.g., an arm 2030 of the polygonal mounting bracket 2020).

Materials

Components of a clamp assembly may be fabricated of any suitably resilient material, including polymeric material and metal. In aspects, a clamp (e.g., clamp 110) is formed of a polymeric material. A suitable polymeric material may include one or more of polyamide, polyamide 6.6, nylon 6, nylon, polypropylene, and polyphenylene sulfide (PPS). In aspects, a bracket (e.g., bracket 140) is formed of a metal material. A suitable metal material may include spring steel, stainless steel, and the like. One or more of the components of the clamp assembly may be formed of the same material as the other components, or of a different material than the other components.

Example Methods

Also disclosed are methods. The operations (or steps) of a method may include one or more operations that may be performed in, but are not necessarily limited to, the order or combinations described herein. Further, any of one or more of the operations may be repeated, combined, or reorganized to provide other operations utilizing examples techniques of this disclosure.

The disclosed methods include methods of manufacturing the disclosed clamp assemblies (as described above). In an aspect, a method of manufacturing a clamp assembly includes molding a clamp assembly configured for securing an elongate member to a support structure, the clamp assembly including a clamp, a bracket, and an interlock mechanism. The clamp includes a first clamp member and a second clamp member. At least one of the first clamp member or the second clamp member defines a passageway configured to enclose at least a portion of the elongate member. The clamp further includes a mounting member defined in at least one of the first clamp member or the second clamp member. The mounting member includes a mounting insert channel configured to receive a clamp mounting attachment. The bracket includes a base. The base includes the clamp mounting attachment configured for receipt into the mounting insert channel of the mounting member to connect the bracket to the clamp. The bracket also includes a support structure connector configured for attaching the bracket to the support structure. In aspects, the attachment may be releasable. The interlock mechanism is configured for connecting the mounting member of the clamp and the base of the bracket together. In aspects, the connection may be releasable.

The disclosed methods include methods of using clamp assemblies described above. In an aspect, a method of using a clamp assembly includes providing a clamp assembly including a clamp and a bracket, the bracket including a hook portion configured for receiving onto a support structure. The support structure includes a torque tube and a band clamp. The band clamp includes a first end collar, a second end collar, a tangentially arranged rod and nut connector that extends between the first and second end collars, and a flexible metal strap. The flexible metal strap extends around the torque tube, from the first end collar to the second end collar. The rod and nut connector enables the band clamp to be adjustably tightened around the torque tube. The rod and nut connector includes a rod that may be threaded. The method further includes positioning a tip of the hook portion adjacent the rod, looping the hook portion onto the rod, pulling on the clamp assembly until the hook portion is seated on the rod, releasing the clamp assembly to allow gravity to rotate the clamp assembly around the rod, inserting an elongate member into a passageway of the clamp assembly, and closing a locking mechanism of the clamp assembly to secure the clamp assembly to the elongate member.

Additional Examples

Some additional examples of clamp assemblies and techniques for manufacturing and using the same include the following:

Example 1. A clamp assembly configured for securing an elongate member to a support structure, the clamp assembly comprising: a clamp, the clamp including: a first clamp member; a second clamp member, at least one of the first clamp member or the second clamp member defining a passageway configured to enclose at least a portion of the elongate member; and a mounting member defined in at least one of the first clamp member or the second clamp member, the mounting member including a mounting insert channel configured to receive a clamp mounting attachment; and a bracket, the bracket comprising: a base, the base including the clamp mounting attachment configured for receipt into the mounting insert channel of the mounting member to connect the bracket to the clamp; and a support structure connector configured for attaching the bracket to the support structure; and an interlock mechanism configured for connecting the mounting member of the clamp and the base of the bracket together.

Example 2. The clamp assembly of Example 1, wherein the base further comprises: a first portion having a first width; and a second portion having a second width, the first width narrower than the second width, the first portion configured for flexing relative to the second portion.

Example 3. The clamp assembly of Example 2, wherein the mounting member includes a retention tab extending from a bottom side of the at least one of the first and second clamp members, wherein the base includes a receiver configured to receive the retention tab therein, wherein the receiver is defined in the first portion, and wherein the interlock mechanism comprises: the retention tab; and the receiver.

Example 4. The clamp assembly of Example 3, wherein the base further includes a release mechanism configured to release the retention tab from the receiver.

Example 5. The clamp assembly of Example 1, wherein the mounting insert channel includes a pair of laterally extending upper flanges opposing a pair of laterally extending lower flanges, the pairs of upper and lower flanges defining respective first and second slots therebetween, the first and second slots open at first ends, and the first and second slots being configured for receiving the clamp mounting attachment of the base therein.

Example 6. The clamp assembly of Example 5, wherein the lower flanges respectively include a first ramp and a second ramp adjacent the open first ends and facing the upper flanges, and wherein the base further comprises at least one bent runner extending obliquely to a plane of the base, the bent runner configured to mate with a ramp of a lower flange of the mounting insert channel to create a slight interference for a non-rattling fit.

Example 7. The clamp assembly of Example 1, wherein the passageway is defined by a first passageway defined in the first clamp member that aligns with a second passageway defined in the second clamp member.

Example 8. The clamp assembly of Example 1, wherein the support structure connector comprises: a hook portion, the hook portion configured for hanging on an elongated portion of the support structure.

Example 9. The clamp assembly of Example 1, wherein from the base, the bracket has an approximate orthogonal upward first bend forming an upwardly extending first leg, the upwardly extending first leg having a second bend forming a dogleg segment that is angled inwardly from a plane of the upwardly extending first leg at an angle, the dogleg segment having a third bend that is angled outwardly from a plane of the dogleg segment at an angle, the third bend forming an upwardly extending second leg oriented generally perpendicular to the plane of the upwardly extending first leg, the upwardly extending second leg having a hook bend that is angled outwardly from a plane of the upwardly extending second leg and forming a hook portion.

Example 10. The clamp assembly of Example 9, wherein the hook portion further comprises radiused edges.

Example 11. The clamp assembly of Example 1, wherein the support structure connector comprises: a clip defining a holder configured for receiving a portion of the support structure.

Example 12. The clamp assembly of Example 11, wherein the clip is defined by, from the base, the bracket having an approximate orthogonal upward first bend forming an upwardly extending first leg, the upwardly extending first leg having a second bend forming a first cover segment that is angled inwardly from a plane of the upwardly extending first leg at an angle, the first cover segment oriented generally parallel to a plane of the base, the first cover segment having a segment bend that is angled inwardly from a plane of the first cover segment at an angle, the third bend forming an inwardly extending second cover segment oriented generally oblique to the plane of the first cover segment, the second cover segment having a third bend forming a downwardly extending third leg oriented generally parallel to the plane of the upwardly extending first leg, the downwardly extending second leg having a fourth bend that is angled inwardly from a plane of the downwardly extending second leg and forming a fourth leg.

Example 13. The clamp assembly of Example 12, wherein the portion of the support structure is an arm of the support structure extending through the holder, and wherein the cover segment comprises at least one inwardly extending tooth configured for biting engagement of the arm of the support structure.

Example 14. The clamp assembly of Example 1, wherein the clamp further comprises a locking mechanism, the locking mechanism including: a slotted opening defined by the first clamp member; a tongue member projecting from the second clamp member, the tongue member further including a plurality of serrations extending along a length of the tongue member and across a width of the tongue member, the tongue member configured to be received in the slotted opening; and a wedge-shaped pawl defined in the first clamp member, the pawl having a plurality of teeth disposed within the slotted opening, the plurality of teeth configured to interlock with the plurality of serrations when the tongue member is inserted into the slotted opening.

Example 15. The clamp assembly of Example 1, wherein the first clamp member includes a first clamp member first end, the second clamp member includes a second clamp member first end, and the clamp further comprises a hinge mechanism joining the first ends of the first and second clamp members; and wherein the first clamp member includes a first locking mechanism, the second clamp member includes a second locking mechanism, the first and second locking mechanisms configured for locking a position of respective second ends of the first and second clamp members together around the elongate member with the elongate member received in the passageway.

Example 16. A clamp assembly configured for securing an elongate member to a support structure, the clamp assembly comprising: a clamp, the clamp including: a first clamp member including a first clamp member first end, a second clamp member including a second clamp member first end; a hinge mechanism joining the first ends of the first and second clamp members; at least one of the first clamp member or the second clamp member defining a passageway configured to enclose at least a portion of the elongate member; the first clamp member including a first locking mechanism, the second clamp member including a second locking mechanism, the first and second locking mechanisms configured for locking a position of respective second ends of the first and second clamp members together around the elongate member with the elongate member received in the passageway; a mounting member defined in at least one of the first clamp member or the second clamp member, the mounting member defining a mounting insert channel configured to receive a clamp mounting attachment; and a bracket, the bracket configured to connect with the mounting member, the bracket comprising: a base, the base including the clamp mounting attachment configured for receipt into the mounting insert channel of the mounting member to connect the bracket to the clamp; and a support structure connector configured for attaching the bracket to the support structure; and an interlock mechanism configured for connecting the mounting member of the clamp and the base of the bracket together.

Example 17. The clamp assembly of Example 16, wherein the support structure connector comprises: a hook portion, the hook portion configured for hanging on an elongated portion of the support structure.

Example 18. The clamp assembly of Example 16, wherein from the base, the bracket has an approximate orthogonal upward first bend forming an upwardly extending first leg, the upwardly extending first leg having a second bend forming a dogleg segment that is angled inwardly from a plane of the upwardly extending first leg at an angle, the dogleg segment having a third bend that is angled outwardly from a plane of the dogleg segment at an angle, the third bend forming an upwardly extending second leg oriented generally perpendicular to the plane of the upwardly extending first leg, the upwardly extending second leg having a hook bend that is angled outwardly from a plane of the upwardly extending second leg and forming a hook portion.

Example 19. The clamp assembly of Example 16, wherein the support structure connector comprises: a clip defining a holder configured for receiving a portion of the support structure.

Example 20. The clamp assembly of Example 16, wherein from the base, the bracket has an approximate orthogonal upward first bend forming an upwardly extending first leg, the upwardly extending first leg having a second bend forming a first cover segment that is angled inwardly from a plane of the upwardly extending first leg at an angle, the first cover segment oriented generally parallel to a plane of the base, the first cover segment having a segment bend that is angled inwardly from a plane of the first cover segment at an angle, the segment bend forming an inwardly extending second cover segment oriented generally oblique to the plane of the first cover segment, the second cover segment having a third bend forming a downwardly extending third leg oriented generally parallel to a plane of the upwardly extending first leg, the downwardly extending second leg having a fourth bend that is angled inwardly from the plane of the downwardly extending second leg and forming a fourth leg.

Example 21. The clamp assembly of Example 3, wherein the base further includes an approximate orthogonal upward bend forming an upwardly extending tail leg.

Example 22. The clamp assembly of Example 11, wherein the hook portion is C-shaped.

Example 23. The clamp assembly of Example 11, wherein the upwardly extending second leg is oriented generally perpendicular to the plane of the upwardly extending first leg.

Example 24. The clamp assembly of Example 11, wherein the hook portion has a tip bend that is angled outwardly from the hook portion to form a ramp portion.

Example 25. The clamp assembly of Example 9, wherein the hook portion is configured for hanging on a threaded bolt and is configured for rotating at such engagement as the threaded bolt rotates relative to the clamp assembly.

Conclusion

Although implementations of clamp assemblies, techniques for manufacturing clamp assemblies, and techniques for using clamp assemblies have been described in language specific to certain features and/or methods, the subject of the appended claims is not necessarily limited to the specific features or methods described. Rather, the specific features and methods are disclosed as example implementations of clamp assemblies, techniques for manufacturing clamp assemblies, and techniques for using clamp assemblies.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

What is claimed is:

1. A clamp assembly configured for securing an elongate member to a support structure, the clamp assembly comprising:
    a clamp, the clamp including:
        a first clamp member;
        a second clamp member, at least one of the first clamp member or the second clamp member defining a passageway configured to enclose at least a portion of the elongate member; and
        a mounting member defined in at least one of the first clamp member or the second clamp member, the mounting member including a mounting insert channel configured to receive a clamp mounting attachment; and
    a bracket, the bracket comprising:
        a base, the base including the clamp mounting attachment configured for receipt into the mounting insert channel of the mounting member to connect the bracket to the clamp; and
        a support structure connector configured for attaching the bracket to the support structure; and
    an interlock mechanism configured for connecting the mounting member of the clamp and the base of the bracket together.

2. The clamp assembly of claim 1, wherein the base further comprises:
    a first portion having a first width; and
    a second portion having a second width, the first width narrower than the second width, the first portion configured for flexing relative to the second portion.

3. The clamp assembly of claim 2,
    wherein the mounting member includes a retention tab extending from a bottom side of the at least one of the first and second clamp members,
    wherein the base includes a receiver configured to receive the retention tab therein,
    wherein the receiver is defined in the first portion, and
    wherein the interlock mechanism comprises:
        the retention tab; and
        the receiver.

4. The clamp assembly of claim 3, wherein the base further includes a release mechanism configured to release the retention tab from the receiver.

5. The clamp assembly of claim 1, wherein the mounting insert channel includes a pair of laterally extending upper flanges opposing a pair of laterally extending lower flanges, the pairs of upper and lower flanges defining respective first and second slots therebetween, the first and second slots being open at first ends, and the first and second slots being configured for receiving the clamp mounting attachment of the base therein.

6. The clamp assembly of claim 5,
    wherein the lower flanges respectively include a first ramp and a second ramp adjacent the open first ends and facing the upper flanges, and
    wherein the base further comprises at least one bent runner extending obliquely to a plane of the base, the bent runner configured to mate with a ramp of a lower flange of the mounting insert channel to create a slight interference for a non-rattling fit.

7. The clamp assembly of claim 1, wherein the passageway is defined by a first passageway defined in the first clamp member that aligns with a second passageway defined in the second clamp member.

8. The clamp assembly of claim 1, wherein the support structure connector comprises:
    a hook portion, the hook portion configured for hanging on an elongated portion of the support structure.

9. The clamp assembly of claim 1, wherein from the base, the bracket has an approximate orthogonal upward first bend forming an upwardly extending first leg, the upwardly extending first leg having a second bend forming a dogleg segment that is angled inwardly from a plane of the upwardly extending first leg at an angle, the dogleg segment having a third bend that is angled outwardly from a plane of the dogleg segment at an angle, the third bend forming an upwardly extending second leg oriented generally perpendicular to the plane of the upwardly extending first leg, the upwardly extending second leg having a hook bend that is angled outwardly from a plane of the upwardly extending second leg and forms a hook portion.

10. The clamp assembly of claim 9, wherein the hook portion further comprises radiused edges.

11. The clamp assembly of claim 1, wherein the support structure connector comprises:
    a clip defining a holder configured for receiving a portion of the support structure.

12. The clamp assembly of claim 11, wherein the clip is defined by, from the base, the bracket having an approximate orthogonal upward first bend forming an upwardly extending first leg, the upwardly extending first leg having a second bend forming a first cover segment that is angled inwardly from a plane of the upwardly extending first leg at an angle, the first cover segment oriented generally parallel to a plane of the base, the first cover segment having a segment bend that is angled inwardly from a plane of the first cover segment at an angle, the segment bend forming an inwardly extending second cover segment oriented generally oblique to the plane of the first cover segment, the second cover segment having a third bend forming a downwardly extending third leg oriented generally parallel to the plane of the upwardly extending first leg, the downwardly extending second leg having a fourth bend that is angled inwardly from a plane of the downwardly extending second leg and forming a fourth leg.

13. The clamp assembly of claim 12,
    wherein the portion of the support structure is an arm of the support structure extending through the holder, and
    wherein at least one of the first cover segment or the second cover segment comprises at least one inwardly extending tooth configured for biting engagement of the arm of the support structure.

14. The clamp assembly of claim 1, wherein the clamp further comprises a locking mechanism, the locking mechanism including:
- a slotted opening defined by the first clamp member;
- a tongue member projecting from the second clamp member, the tongue member further including a plurality of serrations extending along a length of the tongue member and across a width of the tongue member, the tongue member configured to be received in the slotted opening; and
- a pawl defined in the first clamp member, the pawl having a plurality of teeth disposed within the slotted opening, the plurality of teeth configured to interlock with the plurality of serrations when the tongue member is inserted into the slotted opening.

15. The clamp assembly of claim 1,
wherein the first clamp member includes a first clamp member first end, the second clamp member includes a second clamp member first end, and the clamp further comprises a hinge mechanism joining the first ends of the first and second clamp members; and
wherein the first clamp member includes a first locking mechanism, the second clamp member includes a second locking mechanism, the first and second locking mechanisms configured for locking a position of respective second ends of the first and second clamp members together around the elongate member with the elongate member received in the passageway.

16. A clamp assembly configured for securing an elongate member to a support structure, the clamp assembly comprising:
- a clamp, the clamp including:
  - a first clamp member including a first clamp member first end,
  - a second clamp member including a second clamp member first end;
  - a hinge mechanism joining the first ends of the first and second clamp members;
  - at least one of the first clamp member or the second clamp member defining a passageway configured to enclose at least a portion of the elongate member;
  - the first clamp member including a first locking mechanism, the second clamp member including a second locking mechanism, the first and second locking mechanisms configured for locking a position of respective second ends of the first and second clamp members together around the elongate member with the elongate member received in the passageway;
  - a mounting member defined in at least one of the first clamp member or the second clamp member, the mounting member defining a mounting insert channel configured to receive a clamp mounting attachment; and
- a bracket, the bracket configured to connect with the mounting member, the bracket comprising:
  - a base, the base including the clamp mounting attachment configured for receipt into the mounting insert channel of the mounting member to connect the bracket to the clamp; and
  - a support structure connector configured for attaching the bracket to the support structure; and
- an interlock mechanism configured for connecting the mounting member of the clamp and the base of the bracket together.

17. The clamp assembly of claim 16, wherein the support structure connector comprises:
- a hook portion, the hook portion configured for hanging on an elongated portion of the support structure.

18. The clamp assembly of claim 16, wherein from the base, the bracket has an approximate orthogonal upward first bend forming an upwardly extending first leg, the upwardly extending first leg having a second bend forming a dogleg segment that is angled inwardly from a plane of the upwardly extending first leg at an angle, the dogleg segment having a third bend that is angled outwardly from a plane of the dogleg segment at an angle, the third bend forming an upwardly extending second leg oriented generally perpendicular to the plane of the upwardly extending first leg, the upwardly extending second leg having a hook bend that is angled outwardly from a plane of the upwardly extending second leg and forming a hook portion.

19. The clamp assembly of claim 16, wherein the support structure connector comprises:
- a clip defining a holder configured for receiving a portion of the support structure.

20. The clamp assembly of claim 16, wherein from the base, the bracket has an approximate orthogonal upward first bend forming an upwardly extending first leg, the upwardly extending first leg having a second bend forming a first cover segment that is angled inwardly from a plane of the upwardly extending first leg at an angle, the first cover segment oriented generally parallel to a plane of the base, the first cover segment having a segment bend that is angled inwardly from a plane of the first cover segment at an angle, the segment bend forming an inwardly extending second cover segment oriented generally oblique to the plane of the first cover segment, the second cover segment having a third bend forming a downwardly extending third leg oriented generally parallel to the plane of the upwardly extending first leg, the downwardly extending second leg having a fourth bend that is angled inwardly from a plane of the downwardly extending second leg and forming a fourth leg.

* * * * *